(12) United States Patent
Huq et al.

(10) Patent No.: US 12,551,380 B2
(45) Date of Patent: Feb. 17, 2026

(54) SENSING DEVICE FOR SENSING A COMPRESSIVE PRESSURE

(71) Applicant: Oxford Healthtech Ltd., Newbury (GB)

(72) Inventors: Syed Ejazul Huq, Abingdon (GB); Mohamad Yasser Al Aioubi, Didcot (GB)

(73) Assignee: Oxford Healthtech Ltd., Newbury (GB)

( * ) Notice: Subject to any disclaimer, the term of this patent is extended or adjusted under 35 U.S.C. 154(b) by 207 days.

(21) Appl. No.: 18/554,087

(22) PCT Filed: Apr. 6, 2022

(86) PCT No.: PCT/GB2022/050863
§ 371 (c)(1),
(2) Date: Oct. 5, 2023

(87) PCT Pub. No.: WO2022/214808
PCT Pub. Date: Oct. 13, 2022

(65) Prior Publication Data
US 2024/0197539 A1  Jun. 20, 2024

(30) Foreign Application Priority Data

Apr. 8, 2021 (GB) ..................................... 2105031

(51) Int. Cl.
*A61F 13/08* (2006.01)
*A61B 17/135* (2006.01)
(Continued)

(52) U.S. Cl.
CPC ............ *A61F 13/08* (2013.01); *A61B 17/135* (2013.01); *A61F 5/30* (2013.01); *G01L 1/142* (2013.01);
(Continued)

(58) Field of Classification Search
CPC .. A61F 13/08; A61F 5/30; A61F 2013/00957; A61F 13/00051;
(Continued)

(56) References Cited

U.S. PATENT DOCUMENTS 10,285,867 B2 * 5/2019 Rapp ................. A61F 13/00063
10,888,464 B2   1/2021 Huq
(Continued)

OTHER PUBLICATIONS

Combined Search and Examination Report for corresponding GB Application No. GB2105031.5, dated Oct. 11, 2021, 6 pages.
(Continued)

*Primary Examiner* — Julian W Woo
(74) *Attorney, Agent, or Firm* — Dority & Manning, P.A.

(57) ABSTRACT

A sensing device for sensing a compressive pressure applied by a compression bandage or a compression garment comprises a flexible substrate for wearing beneath the compression bandage or the compression garment. The sensing device also comprises a compression sensor attached to the flexible substrate, the compression sensor comprising an input and an output and a signal path therebetween. The input and the output are arranged such that a sensor signal received by the output varies in dependence on a relative configuration of the input and the output and/or the signal path therebetween. Also, the input and the output are arranged such that their relative configuration varies in dependence on a compressive pressure applied to the compression sensor, the compressive pressure having a component perpendicular to the substrate.

13 Claims, 11 Drawing Sheets

(51) Int. Cl.
| | |
|---|---|
| *A61F 5/30* | (2006.01) |
| *A61F 13/00* | (2024.01) |
| *G01L 1/14* | (2006.01) |
| *G01L 1/22* | (2006.01) |
| *G01L 1/24* | (2006.01) |

(52) U.S. Cl.
CPC ............... *G01L 1/22* (2013.01); *G01L 1/242* (2013.01); *A61F 2013/00957* (2013.01)

(58) Field of Classification Search
CPC ..... A61B 17/135; A61B 5/445; A61B 5/6801; G01L 1/22; G01L 5/00
See application file for complete search history.

(56) References Cited

U.S. PATENT DOCUMENTS

2013/0192071 A1    8/2013  Esposito et al.
2020/0155362 A1*   5/2020  Pedley ................ A61B 5/6828

OTHER PUBLICATIONS

PCT International Search Report and Written Opinion for corresponding PCT Application No. PCT/GB2022/050863, mailed Jul. 19, 2022, 8 pages.
International Preliminary Report on Patentability received in corresponding Application No. PCT/GB2022/050863, dated Oct. 10, 2023, 7 pages.

* cited by examiner

SENSING DEVICE FOR SENSING A COMPRESSIVE PRESSURE

CROSS-REFERENCE TO RELATED APPLICATIONS

This application is a national phase entry of International Patent Application No. PCT/GB2022/050863, filed Apr. 6, 2022, which, in turn, is based upon and claims the right of priority to UK Patent Application No. 2105031.5, filed on Apr. 8, 2021, the disclosures of both of which are hereby incorporated by reference herein in their entirety by reference for all purposes.

FIELD OF THE INVENTION

The present invention relates to a sensing device for sensing a compressive pressure applied by a compression bandage or by a compression garment.

BACKGROUND

Compression therapy via the wearing of a compression bandage (or elasticated compression garment) is widely used for the treatment and management of blood circulatory problems. These include venous deficiencies, which can cause venous leg ulcers and deep vein thrombosis. Compression therapy also assists in the movement and removal of trapped fluid in the body's lymphatic system, which can help to reduce or prevent lymphoedema. Other applications of compression bandages include the treatment of wrist or ankle sprains, muscle sprains, swollen limbs and contusions or bruises.

To work optimally, compression bandages should provide a predetermined amount of compression (pressure) to the relevant body part of the wearer. Incorrect application of compression can lead to uneven and inadequate pressures, or to hazardous levels of excessive pressure. In particular, injudicious use of compression in limbs with arterial disease has been reported to cause severe skin and tissue necrosis (in some instances calling for amputation).

Owing to the varying shapes and sizes of the different body parts to which a compression bandage may be applied, it is desirable to have a sensing device for sensing the actual compressive pressure, such as the actual graduated compressive pressure, applied to a wearer by a compression bandage in use. The present invention seeks to provide such a sensing device which provides various advantages over those of the prior art.

SUMMARY

According to the present invention, there is provided a sensing device for sensing a compressive pressure, (e.g. a graduated compressive pressure) applied by a compression bandage (or a compression garment). The sensing device comprises a flexible substrate for wearing beneath the compression bandage (or the compression garment) and a compression sensor attached to the flexible substrate. The compression sensor comprises an input and an output. There is a signal path between the input and the output. The input and the output are arranged such that a sensor signal received by the output varies in dependence on a relative configuration of the input and the output and/or the signal path. The input and the output are arranged such that their relative configuration varies in dependence on a compressive pressure applied to the compression sensor, the compressive pressure having a component perpendicular to the substrate.

Advantageous features of the sensing device are set out in the appended claims.

BRIEF DESCRIPTION OF THE DRAWINGS

Examples of the present invention will now be described by way of example with reference to the accompanying drawings in which.

DETAILED DESCRIPTION

The present invention relates to a sensing device for sensing a compressive pressure (e.g. a graduated compressive pressure) applied by a compression bandage (or a compression garment). The sensing device comprises a flexible substrate for wearing beneath the compression bandage (or the compression garment) and a compression sensor attached to the flexible substrate. The compression sensor comprises an input and an output. There is a signal path between the input and the output. The input and the output are arranged such that a sensor signal received by the output varies in dependence on a relative configuration of the input and the output and/or the signal path. The input and the output are arranged such that their relative configuration varies in dependence on a compressive pressure applied to the compression sensor, the compressive pressure having a component perpendicular to the substrate.

Figure 1A:
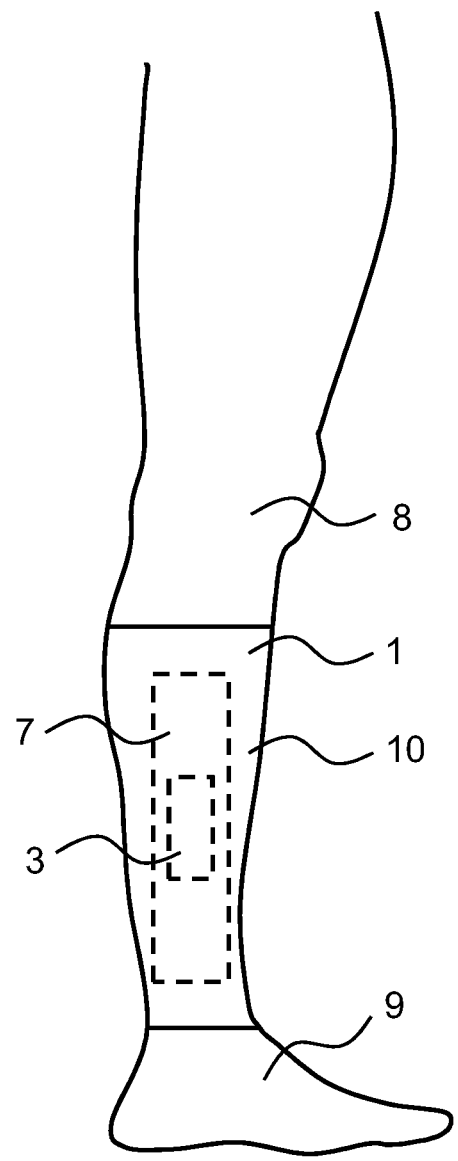
FIG. 1A is an example of the sensing device in situ, under a compression bandage on the wearer's leg.

The sensing device is designed so that the substrate and compression sensor are worn under a compression bandage (or compression garment) on the human or animal body. An example is shown in FIG. 1A. More specifically, FIG. 1A shows a human leg, having a knee 8, a mid-calf 10 and an ankle 9. FIG. 1A also shows the flexible substrate 7 and the attached compression sensor 3 worn on the human leg at a location between the knee 8 and the ankle 9. The flexible substrate 7 and the compression sensor 3 are worn beneath a compression bandage 1 in FIG. 1A. Preferably, the flexible substrate 7 and the compression sensor 3 are worn on top of a non-elasticated dressing (e.g. Velband) so that there is a barrier between the wearer's skin and the substrate 7.

In use, the compression bandage 1 or compression garment applies pressure to the compression sensor 3 as well as to the leg. The more tightly the compression bandage is wrapper around the leg, the greater the compressive pressure applied to the leg. For treatment of venous leg ulcers, a graduated application of pressure up the leg is generally required, from relatively higher pressure nearer the ankle to relatively lower pressure nearer the knee. As such, compression bandages are more appropriate than elasticated compression garments for treatment of venous leg ulcers. An exemplary graduated compression profile will be described later.

Figure 1B:
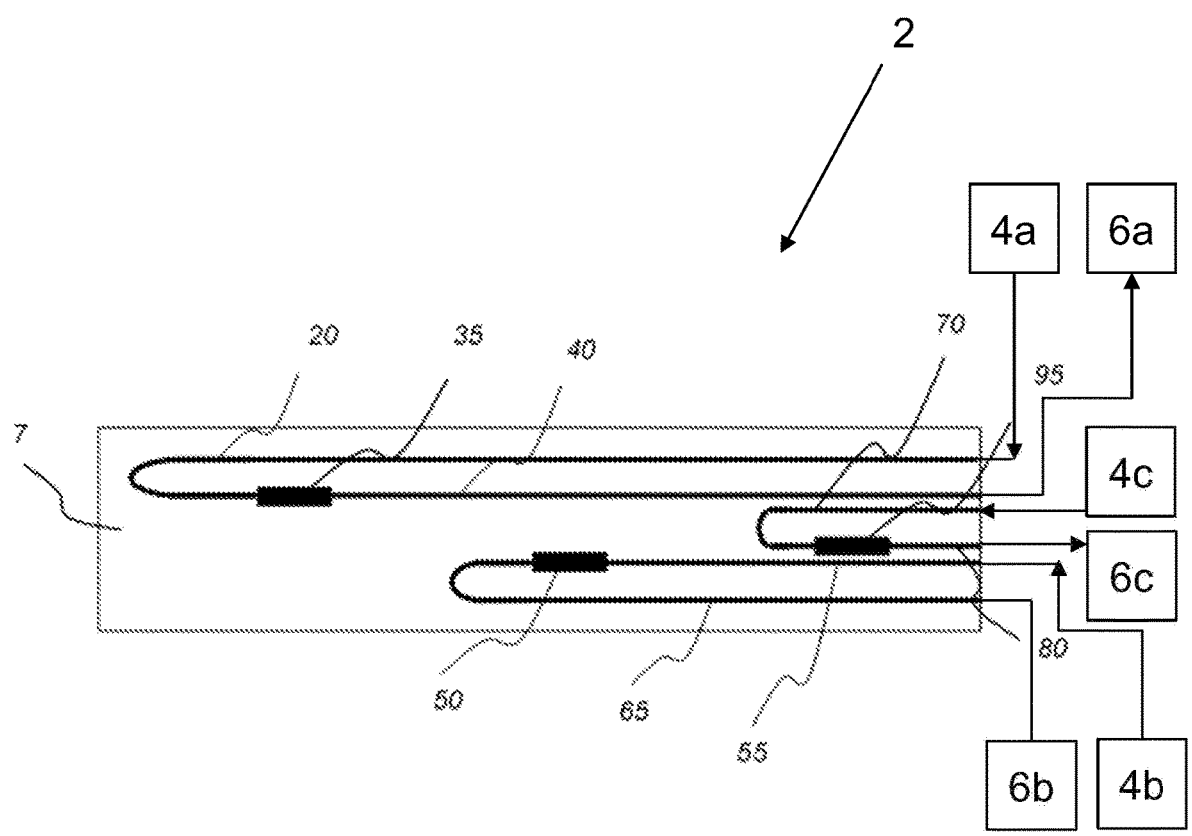
FIG. 1B is an example of the substrate of the sensing device of FIG. 1A, viewed from above, with multiple compression sensors arranged on the substrate.

An example of the sensing device is shown in FIG. 1B. In FIG. 1B, the sensing device 2 comprises three compression sensors: a first compression sensor 35, a second compression sensor 50 and a third compression sensor 95. Each of the three compression sensors 35, 50, 95 is attached to a surface of the flexible substrate 7. Each of the three compression sensors 35, 50, 95 comprises a respective input and output having a signal path therebetween (not shown in FIG. 1B).

The flexible substrate 7 may be constructed from a polymeric material. However, the skilled person would understand that other flexible materials, such as paper, would also be suitable. The substrate 7 is elongate, having a length longer than its width. The length of the substrate 7 is comparable to a typical ankle-to-knee length for an adult. The width of the substrate 7 is less that the circumference of a typical adult calf. For example, the substrate may have a length of approximately 45 cm or less, and a width of approximately 15 cm. The thickness of the substrate is preferably less than 1 mm so as to be unobtrusive to the wearer. However, the skilled person would understand that substrates having dimensions other than those described may also be suitable, and different sized substrates may be provided for different sized legs.

The compression sensors 35, 50, 95 are spaced apart from one another. In particular, the compression sensors 35, 50, 95 are spaced apart from one another by predetermined distances along the length of the substrate 7, with the first compression sensor 35 near one end of the substrate 7, the second compression sensor 50 approximately centrally located along the length of the substrate 7, and the third compression sensor 95 located near the other end of the substrate 7.

The overall thickness of the compression sensors 30, 50, 95 and the substrate 7 is preferably less than 3 mm. This very thin profile of the substrate 7 and the compression sensors 30, 50, 95 does not itself cause any significant additional pressure on the body, apart from that intended to be applied by the compression bandage 1. Additional localised pressure under the compression sensors 30, 50, 95 (i.e. a hump effect) is undesirable. The very thin profile of the sensing device 2 also enables the substrate 7 and attached compression sensors 30, 50, 95 to be easily attached to and detached from the body without any discomfort to the wearer.

The sensing device 2 may be arranged such that, in use, the first compression sensor 35 is located just above the ankle of the wearer, the second compression sensor 50 is located at the mid-calf area of the wearer, and the third compression sensor 95 is located just below the knee of the wearer. Such positioning is often desired in the treatment venous leg ulcers, and the predetermined distances between the compression sensors 35, 50, 95 may be determined by clinical recommendation so as to produce a clinically significant graduated pressure measurement profile. For example, for venous leg ulcers, the intended pressure distribution may be 40 mmHg at the ankle, 20 mmHg at the mid-calf, and 15 mmHg below the knee. The skilled person would understand that the placement of sensors may be different for other purposes, such as the management of lymphedema and deep vein thrombosis.

For each compression sensor 35, 50, 95, the sensing device 2 further comprises a respective signal emitter 4a, 4b, 4c, a respective signal detector 6a, 6b, 6c, a respective input connector 20, 55, 70 extending between the respective signal emitter 4a, 4b, 4c and the input of the compression sensor; and a respective output connector 40, 80, 65 extending between the output of the compression sensor and the respective signal detector 6a, 6b, 6c.

Whilst it is required for the compression sensors 35, 50, 95 to be disposed beneath a compression bandage (or garment) in use (such that they are subject to the compressive pressure exerted by the compression bandage), there is no need for the signal emitters 4a, 4b, 4c and the signal detectors 6a, 6b, 6c to be disposed beneath the compression bandage in use. In fact, for wearing comfort, it is often preferable that they are not disposed beneath the compression bandage. The input connectors 20, 55, 70 and the output connectors 40, 80, 65 therefore enable the signal emitter and signal detector to be distant from the compression sensors so that they need not be disposed beneath the compression bandage (or compression garment) in use.

Furthermore, the signal emitters 4a, 4b, 4c and signal detectors 6a, 6b, 6c need not be attached to the substrate. Instead, they may be housed in an electronic control and power unit (ECPU—not shown in FIG. 1B), separate from the substrate. This may be desirable to simplify the construction and maintenance of the sensing device. It may also be desirable to store the active electronic components separately from the substrate for safety reasons, particularly if the substrate is likely to get wet.

The first compression sensor 35 is arranged such that the first signal emitter 4a is connected to the first input connector 20. The first input connector 20 extends between the first signal emitter 4a and the input of the first compression sensor 35. The input of the first compression sensor 35 and the output of the first compression sensor 35 are configured such that, in use, there is a signal path between them (e.g. if the signal were a light signal, the signal path could be an air gap between the input and the output). The first output connector 40 extends between the output of the first compression sensor 35 and the first signal detector 6a. Thus, the first output connector 40 is connected to the first signal detector 6a.

The second compression sensor 50 is arranged analogously to the first compression sensor 35. The second compression sensor 50 is associated with a second input connector 55, a second output connector 65, a second signal emitter 4b and a second signal detector 6b.

The third compression sensor 95 is arranged analogously to the first compression sensor 35 and the second compression sensor 50. The third compression sensor 95 is associated with a third input connector 70, a third output connector 80, a third signal emitter 4c and a third signal detector 6c.

The skilled person would understand that it is not necessary for the sensing device 2 to comprise a respective signal emitter 4a, 4b, 4c for each compression sensor 35, 50, 95 and a respective signal detector 6a, 6b, 6c for each compression sensor 35, 50, 95. Instead, the sensing device 2 could also be configured such that each compression sensor 35, 50, 95 shares a single signal emitter but retains a respective signal detector 6a, 6b, 6c. Alternatively, the sensing device could be configured such that each compression sensor 35, 50, 95 shares a single signal detector, but retains a respective signal emitter 6a, 6b, 6c.

The skilled person would understand that the sensing device 2 may be constructed with more than three compression sensors or fewer than three compression sensors.

In use, with reference to the first compression sensor 35, the input of the first compression sensor 35 and the output of the first compression sensor 35 are arranged such that a sensor signal received by the output of the first compression sensor 35 varies in dependence on a relative configuration of the input of the first compression sensor 35 and the output of the first compression sensor 35 and/or the signal path therebetween. In addition, the input of the first compression sensor 35 and the output of the first compression sensor 35 are arranged such that their relative configuration varies in dependence on a compressive pressure (having a component perpendicular to the substrate 7) applied to the first compression sensor 35.

More specifically, the first signal emitter 4a emits an initial signal. The initial signal enters the first input connector 20. The first input connector 20 guides the initial signal to the input of the first compression sensor 35. There is a signal path between the input and output of the first compression sensor 35. The output of the first compression sensor 35 receives a sensor signal. The sensor signal received by the output of the first compression sensor 35 is based on the initial signal from the input of the first compression sensor 35, and the relative configuration of the input of the first compression sensor 35, the output of the first compression sensor 35 and the signal path therebetween.

For example, in an optical sensor, in which the input and the output are separated by an air gap, the initial signal is the amount of light emitted from the input to the air gap, and the sensor signal is the amount of light received by the output from the air gap. For example, the relative configuration of the input and the output determines the angle at which the light is emitted from the input, and the proportion of the light emitted from input that enters the output. A length of the signal path will also vary in dependence of the relative configuration of the input and the output. Thus, the sensor signal is a proportion of the initial signal and varies in dependence on the relative configuration of the input and the output.

The sensor signal received by the output of the first compression sensor 35 may or may not be the same as the initial signal emitted by the first signal emitter 4a. The first output connector 40 guides the sensor signal received by the output of the first compression sensor 35 to the first signal detector 6a. The first signal detector 6a detects the sensor signal. Preferably, the sensor signal varies in proportion with (or in inverse proportion with) the compressive pressure.

When no compressive pressure is applied to the first compression sensor 35, the input and output of the first compression sensor 35 and the signal path therebetween are arranged in an initial configuration. When a compressive pressure (i.e. a pressure having a component perpendicular to the substrate 7) is applied to the first compression sensor 35, the input and output of the first compression sensor 35 and/or the signal path therebetween varies in configuration. The sensor signal received by the output of the first compression sensor 35 varies in dependence on the relative configuration of the input and the output of the first compression sensor 35 and/or the signal path therebetween. More specifically, the change in the relative configuration of the input and output of the first compression sensor 35 as compared to the initial configuration, and/or the change in the signal path as compared to the initial configuration, depends on the amount of compressive pressure applied to the first compression sensor 35. The change in the relative configuration of the input and output of the first compression sensor 35 and/or the signal path therebetween from the initial configuration results in a change in the sensor signal received by the output of the first compression sensor 35, and hence a change in the sensor signal detected by the first signal detector 6a.

The described components of the second compression sensor 50 and the third compression sensor 95 function analogously.

The compression sensors 35, 50, 95 may be optical compression sensors that measure a change in a light signal. The compression sensors 35, 50, 95 may also be electrical compression sensors that measure a change in an electrical signal, such as electrical resistance or electrical capacitance. The skilled person would understand that other forms of compression sensors, such as magnetic field sensing compression sensors are possible.

Figure 2:
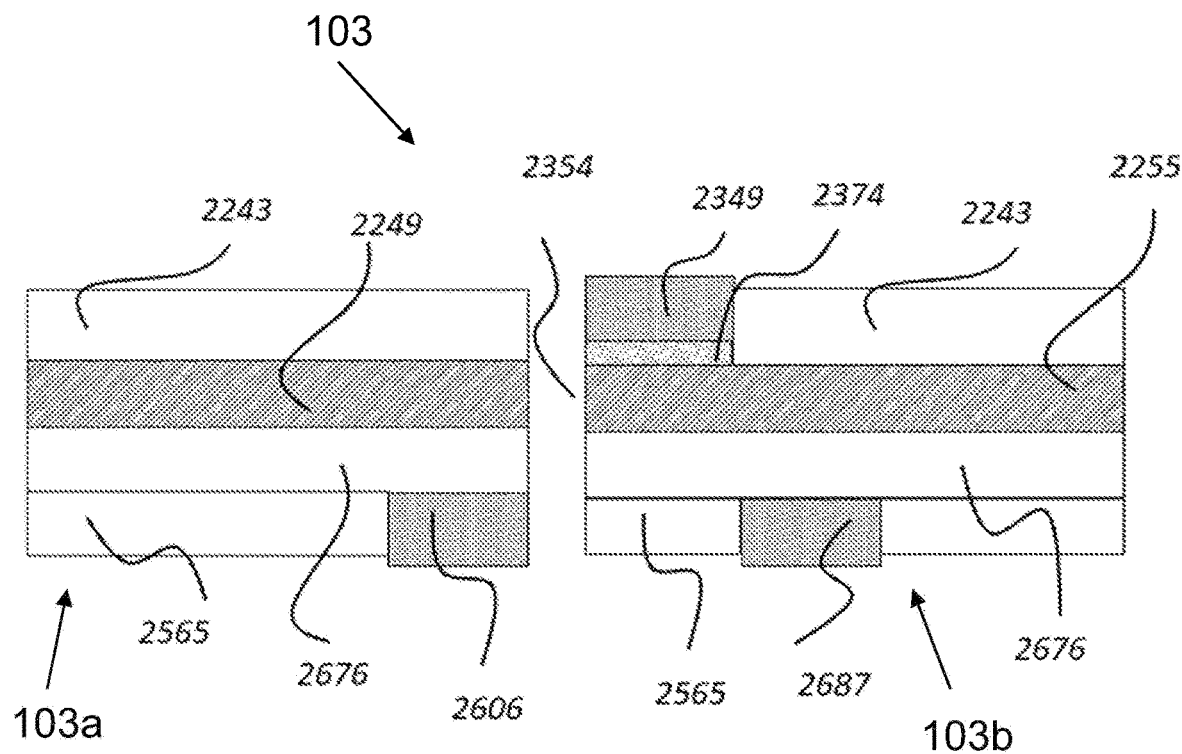
FIG. 2 is a cross section of a first example of an optical compression sensor in an uncompressed configuration (no compressive pressure applied).

Optical Compression Sensor Example 1:

FIG. 2 shows an example of an optical compression sensor 103 on a substrate 2676. The optical compression sensor 103 shown in FIG. 2 could act as at least one of the first compression sensor 35, the second compression sensor 50, and the third compression sensor 95 described in FIG. 1B above. The substrate 2676 forms part of the substrate 7 of FIG. 1B.

For optical compression sensors, such as the compression sensor 103 shown in FIG. 2, the signal emitter is a light source and the signal detector is a light detector. The signal emitter may be one of the signal emitters 4a, 4b, 4c, and will be referred to as "light source 4a, 4b, 4c" hereafter. The signal detector may be one of the signal detectors 6a, 6b, 6c, and will be referred to as "light detector 6a, 6b, 6c" hereafter. The light source is preferably a light emitting diode (LED), e.g. an organic LED, and the light detector is preferably a photodetector or phototransistor.

In FIG. 2, the compression sensor 103 is formed from an input portion 103a and an output portion 103b separated by an air gap 2354. The input portion 103a comprises an input optical fibre 2249 disposed on (or attached to) a first part of the substrate 2676. The input portion 103*a* of the compression sensor 103 further includes first parts of optional upper 2243 and lower 2565 lamination films which encapsulate the input optical fibre 2249 and the first part of the substrate 2676 so as to form a laminated structure. The input portion 103*a* further comprises a first rigid stud 2606. The output portion 103*b* comprises an output optical fibre 2255 disposed on (or attached to) a second part of the substrate 2676. The output portion 103*b* of the compression sensor 103 further includes second parts of the upper 2243 and lower 2565 lamination films which encapsulate the output optical fibre 2255 and the second part of the substrate 2676 so as to form a similar laminated structure. The output portion 103*b* further comprises second 2687 and third 2349 rigid studs. The third stud 2349 is associated with a piece of compressible foam 2374.

In the compression sensor 103 shown in FIG. 2, the input optical fibre 2249 acts as the previously described input connector extending between the light source 4*a*, 4*b*, 4*c* and the input of the compression sensor 103. The output optical fibre 2255 acts as the previously described output connector extending between the output of the compression sensor 103 and the light detector 6*a*, 6*b*, 6*c*. As is well known, the input and output optical fibres may each have a core surrounded by cladding (not shown in FIG. 2). The input optical fibre 2249 has a first end and a second end. The output optical fibre 2255 has a first end and a second end. The first end of the input optical fibre 2249 is connected to the light source 4*a*, 4*b*, 4*c*. The second end of the input optical fibre is the input of the compression sensor 103. Thus, the input optical fibre 2249 extends between the light source 4*a*, 4*b*, 4*c* and the input of the compression sensor 103. The first end of the output optical fibre 2255 is the output of the compression sensor 103. The second end of the output optical fibre is connected to the light detector 6*a*, 6*b*, 6*c*. Thus, the output optical fibre 2255 extends between the output of the compression sensor 103 and the light detector 6*a*, 6*b*, 6*c*.

FIG. 2 schematically illustrates the compression sensor 103 with no compressive pressure applied. In this uncompressed configuration, the second end of the input optical fibre 2249 and the first end of the output optical fibre 2255 are substantially coaxial. The signal path between the input and the output of the compression sensor 103 is a signal path from the second end of the input optical fibre 2249 through the air gap 2354 and to the first end of the output optical fibre 2255.

The three rigid studs 2606, 2349, 2687 may be formed from plastic. As mentioned above, the first stud 2606 is located on the input portion 103*a* of the compression sensor 103. In particular, the first stud 2606 is located adjacent the air gap 2354 and beneath the substrate 2676 such that the substrate 2676 is sandwiched between first stud 2606 and the input optical fibre 2249. As mentioned above, the second stud 2687 is located on the output portion 103*b* of the compression sensor 103. In particular, the second stud 2687 is located a short distance from the air gap 2354 and beneath the substrate 2676 such that the substrate 2676 is sandwiched between second stud 2687 and the output optical fibre 2255. As mentioned above, the third stud 2349 is also located on the output portion 103*b* of the compression sensor 103. In particular, the third stud 2349 is located adjacent the air gap 2354 and above the output optical fibre 2255 such that the output optical fibre 2255 is sandwiched between third stud 2349 and the substrate 2676. The foam 2374 is sandwiched between the third stud 2349 and the output optical fibre 2255. The distance between the second stud 2687 and the air gap 2354 is comparable to the length of the third stud 2349 such that a distal end of the third stud 2349 is located almost directly above a proximal end of the second stud 2687. Preferably, there is no overlap between the second stud 2687 and the third stud 2349.

The studs 2606, 2687, 2359 can be seen to protrude outwards from the laminated structure, The protrusions of the studs 2606, 2687, 2359 from the laminated structure are preferably less than 0.5 mm in height.

The compression sensor 103 may be formed by attaching a single optical fibre to the substrate 2676, and encapsulating the single optical fibre and the substrate 2676 between the upper lamination film 2243 and the lower lamination film 2565. Heat or ultrasound may be then applied to create the laminated structure. The laminated structure may then be cut locally to form the air gap 2354 between the input and output portions 103*a* and 103*b* of the compression sensor 103. The cut may be achieved using a sharp implement, such as a knife. Note that the cut does not separate the entire substrate 7 into two separate portions. In contrast, the cut creates a local slit in the substrate 2676 (which forms part of the substrate 7) such that the substrate 7 remains as a single piece. During manufacture, a section of the lower lamination film 2565 encapsulating the input optical fibre 2249 may be replaced with the first stud 2606, a section of the lower lamination film 2565 encapsulating the output optical fibre 2255 may be replaced with the second stud 2687, and a section of the upper lamination film 2243 encapsulating the output optical fibre 2255 may be replaced with the third stud 2349 and the compressible foam 2374.

In use, the light source 4*a*, 4*b*, 4*c* emits an initial light signal. The initial light signal enters the input optical fibre 2249 at the first end. The input optical fibre 2249 guides the initial light signal from the first end of the input optical fibre 2249 to the second end of the input optical fibre 2249. The initial light signal is emitted from the second end of the input optical fibre 2249 into the air gap 2354. There is a signal path between the second end of the input optical fibre 2249 and the first end of the output optical fibre 2255. The signal path includes the air gap 2354. Typically, when the input optical fibre 2249 and the output optical fibre 2255 are arranged to be substantially coaxial (as in FIG. 2), there is a small loss (in the region of 20%) of the initial signal in transmission along the signal path due to the air gap 2354. The first end of the output optical fibre 2255 receives a sensor signal. The sensor signal is a light signal that comprises at least some of the initial light signal. The output optical fibre 2255 guides the sensor signal received by the first end of the output optical fibre 2255 to the second end of the output optical fibre 2255. The second end of the output optical fibre 2255 is connected to the light detector 6*a*, 6*b*, 6*c*. The light detector 6*a*, 6*b*, 6*c* detects the sensor signal.

Figure 3:
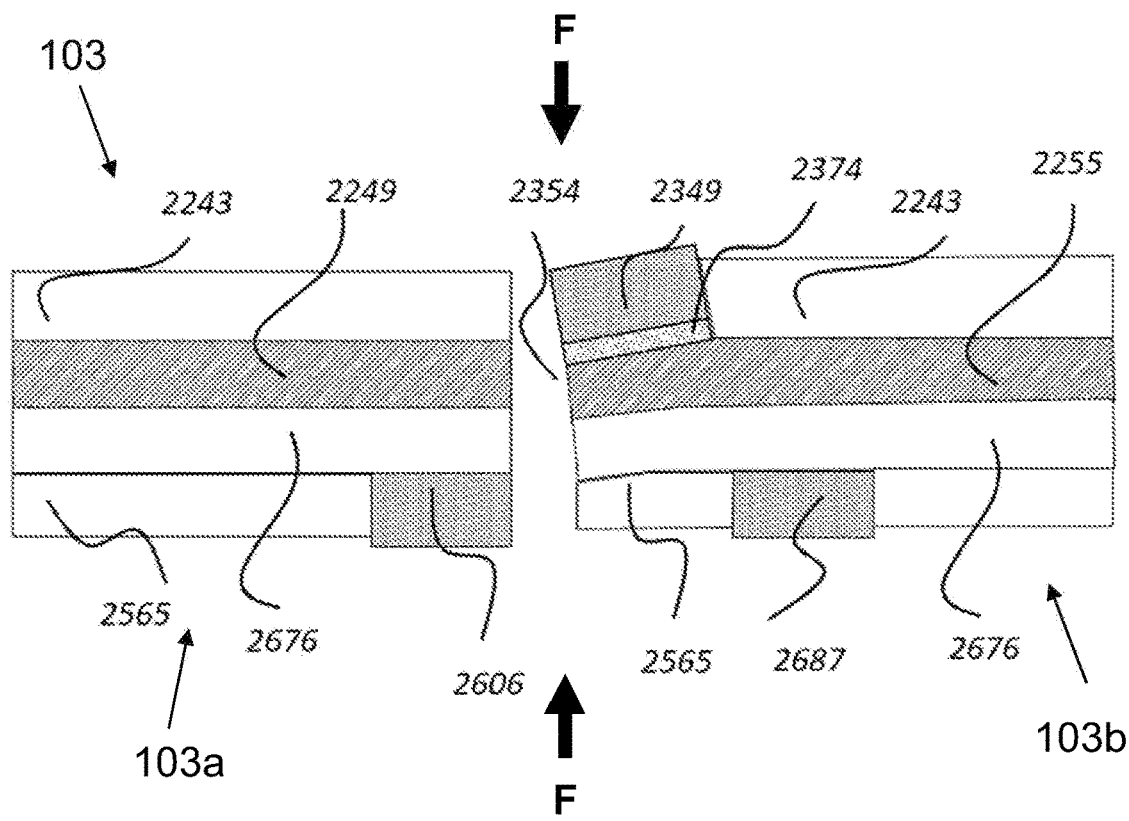
FIG. 3 shows the optical compression sensor of FIG. 2 upon application of compressive pressure.

FIG. 3 shows the optical compression sensor 103 of FIG. 2 in use upon the application of compressive pressure. In use, the compressive pressure may be applied by disposing the compression sensor 103 and substrate 2676 between a compression bandage (or a compression garment) and a human leg, as described above with reference to FIG. 1A. The compressive pressure on the compression sensor 103 is depicted by the arrows labelled F in FIG. 3. In particular, the compressive pressure is in a direction perpendicular to the substrate 2676 (or at least includes a component in a direction perpendicular to the substrate 2676). The input and the output of the compression sensor 103 (i.e. the second end of the input optical fibre 2249 and the first end of the output optical fibre 2255) are arranged such that their relative configuration varies in dependence on a compressive pressure applied to the compression sensor 103. In general, the variation in relative configuration of the input and output of the compression sensor 103 may include a variation in alignment of the input and output and/or a variation in relative position of the input and the output and/or a structural deformation of the input or the output. A variation in relative position of the input and the output may include a relative displacement in a direction perpendicular to the substrate 2676 and/or a relative movement of the input and the output towards and/or away from one another (i.e. parallel to the substrate 2676).

In FIG. 3, the protruding studs 2606, 2687, 2359 transmit compressive pressure to the compression sensor 103. In particular, third stud 2349 advantageously provides a rigid surface through which compressive pressure may be transmitted to the output optical fibre 2255 and the substrate 2676, with the first 2606 and second 2687 studs advantageously providing rigid surfaces upon which to achieve compression. The protrusions of the studs 2606, 2687, 2359 out from the laminated structure improve the ability of the studs 2606, 2687, 2359 to transmit compressive pressure. The studs 2606, 2687, 2359 are arranged to transmit compressive pressure to the input and output of the compression sensor 103 (i.e. to the second end of the input optical fibre 2249 and to the first end of the output optical fibre 2255) in a non-uniform manner such that the input and output of the compression sensor 103 are differentially affected by the compressive pressure. Thus, the application of compressive pressure to the compression sensor 103 changes the relative configuration of the second end of the input optical fibre 2249 and the first end of the output optical fibre 2255. In particular, in FIG. 3, the first end of the output optical fibre 2255 has been displaced (i.e. moved) in a direction perpendicular to the substrate 2676 and has further been deformed (i.e. squashed/compressed) by the application of compressive pressure. Thus, the first and output optical fibres 2249 and 2255 have been moved out of coaxial alignment by the application of compressive pressure. At least a portion of the change in configuration between FIGS. 2 and 3 derives from use of a flexible output optical fibre 2255 such that the first end of the output optical fibre 2255 may be compressed by the compressive pressure. In use, when the compressive pressure is applied to the compression sensor 103, the foam 2374 is compressed. Further the foam 2374 advantageously provides a restoring force and reduces hysteresis.

Whilst FIG. 3 shows a change in the configuration of the first end of the output optical fibre 2255 in response to the compressive pressure, it will be appreciated that alternative configurations of studs could be used to instead provide a change in the configuration of the second end of the input optical fibre 2249 in response to the compressive pressure. The key factor is that the relative configuration of the input and the output of the compression sensor 103 (i.e. the relative configuration of the second end of the input optical fibre 2249 and the first end of the output optical fibre 2255) varies in dependence on a compressive pressure applied to the compression sensor 103.

The sensitivity of the compression sensor 103 depends on the material properties of the substrate 2676, the input optical fibre 2249, the output optical fibre 2255 and the soft compressible foam 2374. The sensitivity of the compression sensor 103 also depends on the relative locations of the studs 2606, 2687, 2359.

In use, the input and the output of the compression sensor 103 (i.e. the second end of the input optical fibre 2249 and the first end of the output optical fibre 2255) are arranged such that the sensor signal received by the output of the compression sensor 103 (i.e. the first end of the output optical fibre 2255) varies in dependence on a relative configuration of the input and output of the compression sensor 103 (i.e. the second end of the input optical fibre 2249 and the first end of the output optical fibre 2255) and/or the signal path therebetween.

In FIG. 3, the second end of the input optical fibre 2249 and the first end of the output optical fibre 2255 are arranged such that the sensor signal varies in dependence on the alignment of the second end of the input optical fibre 2249 and the first end of the output optical fibre 2255. The alignment varies in dependence on the compressive pressure applied to the compression sensor 103. In other words, the change in configuration described above includes a change in alignment.

In response to the compressive pressure of FIG. 3, the second end of the input optical fibre 2249 and the first end of the output optical fibre 2255 undergo a relative displacement in a direction perpendicular to the substrate 2676. The relative displacement in the direction perpendicular to the substrate 2676 varies the alignment of the second end of the input optical fibre 2249 and the first end of the output optical fibre 2255. In other words, the change in configuration described above includes a relative displacement. Furthermore, in response to the compressive pressure, the first end of the output optical fibre 2255 undergoes a structural deformation. The structural deformation also varies the relative configuration (and the relative alignment) of the input and the output. In other words, the change in configuration described above includes a structural deformation.

Since the second end of the input optical fibre 2249 and the first end of the output optical fibre 2255 are misaligned (i.e. no longer coaxial and no longer non-deformed), the amount of the initial light signal emitted from the second end of the input optical fibre 2249 that enters the first end of the output optical fibre 2255 will be lower than in the uncompressed configuration of FIG. 2 in which the second end of the input optical fibre and the first end of the output optical fibre are substantially coaxial and non-deformed. Thus, a larger sensor signal will be detected by the light detector 6a, 6b, 6c in the uncompressed configuration of FIG. 2 as compared to the compressed configuration of FIG. 3. Furthermore, a larger amount of compression will reduce the sensor signal still further. Thus, the detected sensor signal varies in dependence on the amount of compression applied to the compression sensor 103.

Figure 4:
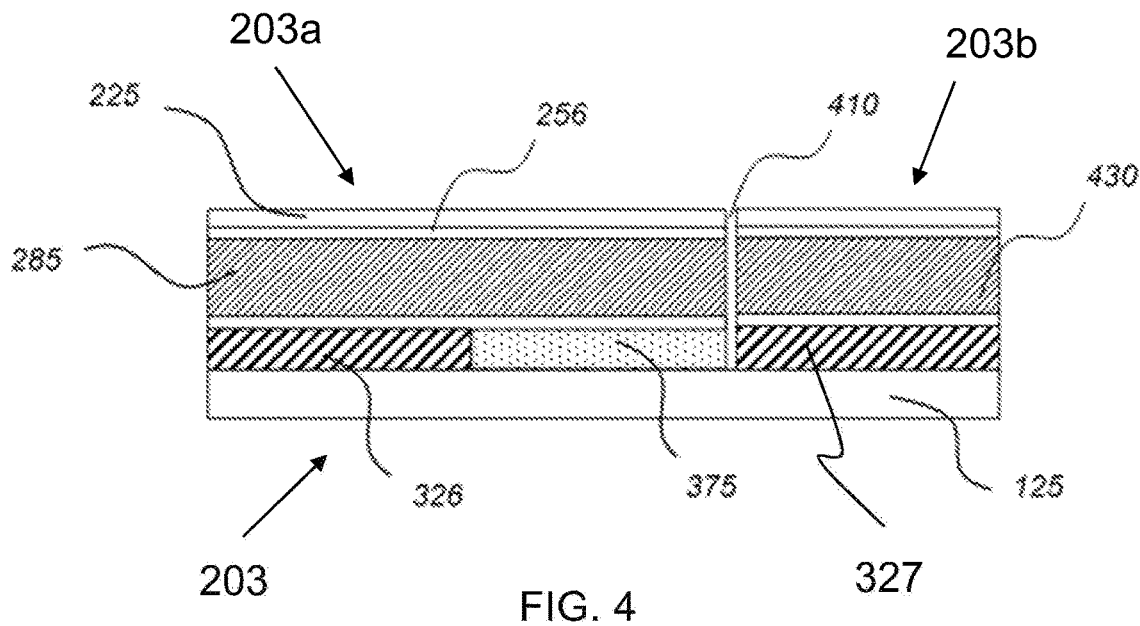
FIG. 4 is a cross section of a second example of an optical compression sensor in an uncompressed configuration (no compressive pressure applied).

Optical Compression Sensor Example 2:

FIG. 4 shows an example of an optical compression sensor 203 on a substrate 125. The optical compression sensor 203 shown in FIG. 4 could act as at least one of the first compression sensor 35, the second compression sensor 50, and the third compression sensor 95 described in FIG. 1B above. The substrate 125 forms part of the substrate 7 of FIG. 1B.

In FIG. 4, the compression sensor 203 is formed from an input portion 203a and an output portion 203b. The input portion 203a comprises an input optical fibre 285, a first rigid spacer 326 and a compressible spacer 375. The first rigid spacer 326 and the compressible spacer 375 are disposed adjacent to one another, and are sandwiched between the input optical fibre 285 and the substrate 125. The input portion 203a of the compression sensor 203 further includes a first part of optional upper lamination film 225 which, along with a first portion of the substrate 125, encapsulates the input optical fibre 285 and spacers 326, 375 so as to form a laminated structure. The output portion 203b comprises an output optical fibre 430 and a second rigid spacer 327. The second rigid spacer 327 is sandwiched between the output optical fibre 430 and the substrate 125. The output portion 203b of the compression sensor 203 further includes a second part of the upper lamination film 225 which, along with a second part of the substrate 125, encapsulates the output optical fibre 430 so as to form a similar laminated structure. There is an air gap 410 between the input optical fibre 285 and the output optical fibre 430. The air gap 410 also extends between the first and second parts of the upper lamination film 225, and between the compressible spacer 375 and the second rigid spacer 327. However, the substrate 125 is continuous (with no air gap) and supports both the input and output portions 203a, 203b of the compression sensor 203

In the compression sensor 203 shown in FIG. 4, the input optical fibre 285 acts as the previously described input connector. The input optical fibre 285 has a core and a cladding 256 that surrounds the core. The output optical fibre 430 acts as the previously described output connector extending between the output of the compression sensor 203 and the light detector 6a, 6b, 6c. The output optical fibre 430 has a core and a cladding that surrounds the core. The input optical fibre 285 has a first end and a second end. The output optical fibre 430 has a first end and a second end. The first end of the input optical fibre 285 is connected to the light source 4a, 4b, 4c. The second end of the input optical fibre 285 is the input of the compression sensor 203. Thus, the input optical fibre 285 extends between the light source 4a, 4b, 4c and the input of the compression sensor 203. The first end of the output optical fibre 430 is the output of the compression sensor 203. The second end of the output optical fibre 430 is connected to the light detector 6a, 6b, 6c. Thus, the output optical fibre 430 extends between the output of the compression sensor 203 and the light detector 6a, 6b, 6c.

FIG. 4 schematically illustrates the compression sensor 203 with no compressive pressure applied. In this uncompressed configuration, the second end of the input optical fibre 285 and the first end of the output optical fibre 430 are substantially coaxial. The signal path between the input and the output of the compression sensor 203 is a signal path from the second end of the input optical fibre 285 through the air gap 410 and to the first end of the output optical fibre 430.

The second rigid spacer 327 is located adjacent to the air gap 410. The compressible spacer 375 is located adjacent to the air gap 410 and opposite the second rigid spacer 327. The first rigid spacer 326 is located adjacent to the compressible spacer 375. Thus, the compression sensor 203 comprises a compressible member (in the form of the compressible spacer 375) between the substrate 125 and the input of the compression sensor 203 (i.e. between the substrate and the second end of the input optical fibre 285). In an alternative configuration (not shown), the compressible spacer 375 could be included in the output portion 203b rather than the input portion 203a. In this alternative configuration, the compression sensor comprises a compressible member (in the form of the compressible spacer) between the substrate 125 the output (i.e. between the substrate and the first end of the output optical fibre 430).

The compression sensor 203 may be formed by attaching a single optical fibre to the spacers 326, 375, 327 arranged on (or attached to) to substrate 125, encapsulating the single optical fibre and spacers 326, 375, 327 between the upper lamination film 225 and the substrate 125. Heat or ultrasound may then be applied to create the laminated structure, the substrate 125 acting as a lower lamination film. The laminated structure may then be cut locally to form the air gap 410 between the input 203a and output 203b portions of the compression sensor 203. No cut is made through the substrate 125, so the input 203a and output 203b portions are linked by a common substrate 125 (the first and second parts of the substrate 125 being the regions of the common substrate 125 located beneath the input optical fibre 285 and the output optical fibre 430 respectively). The cut may be achieved using a sharp implement, such as a knife.

In use, the light source 4a, 4b, 4c emits an initial light signal. The initial light signal emitted by the light source 4a, 4b, 4c enters the input optical fibre 285 at the first end. The input optical fibre 285 guides the initial light signal from the first end of the input optical fibre 285 to the second end of the input optical fibre 285. The initial light signal is emitted from the second end of the input optical fibre 285 to the air gap 410. There is a signal path between the second end of the input optical fibre 285 and the first end of the output optical fibre 430. The signal path passes through the air gap 410. Typically, when the input optical fibre 285 and the output optical fibre 430 are arranged to be substantially coaxial, there is a small loss (in the region of 20%) of the initial signal in transmission along the signal path due to the air gap 410. The first end of the output optical fibre 430 receives a sensor signal. The sensor signal is a light signal that comprises at least some of the initial light signal. The output optical fibre 430 guides the sensor signal received by the first end of the output optical fibre 430 to the second end of the output optical fibre 430. The second end of the output optical fibre 430 is connected to the light detector 6a, 6b, 6c. The light detector detects the sensor signal.

Figure 5:
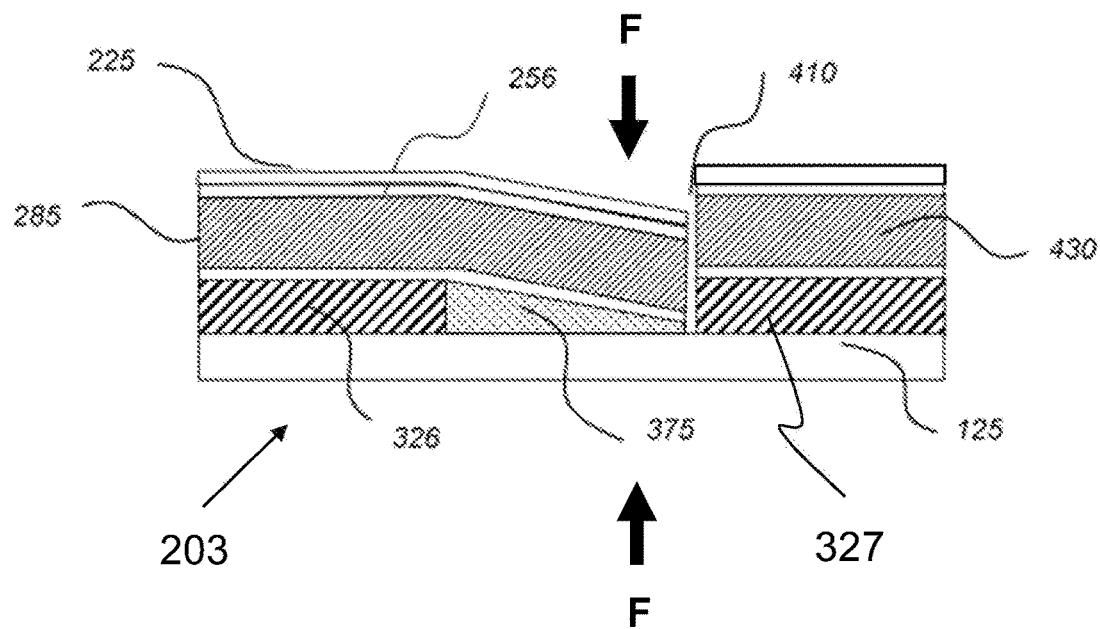
FIG. 5 shows the optical compression sensor of FIG. 4 upon application of compressive pressure.

FIG. 5 shows the optical compression sensor 203 of FIG. 4, in use, and upon the application of compressive pressure.

In use, the compressive pressure may be applied by disposing the compression sensor 203 and substrate 125 between a compression bandage (or a compression garment) and a human leg, as described above with reference to FIG. 1A. The compressive pressure on the compression sensor 203 is depicted by the arrows labelled F in FIG. 5. As in the previous example of FIG. 3, the compressive pressure is in a direction perpendicular to the substrate 125 (or at least includes a component in a direction perpendicular to the substrate 125). The input and the output of the compression sensor 203 (i.e. the second end of the input optical fibre 285 and the first end of the output optical fibre 430) are arranged such that their relative configuration varies in dependence on a compressive pressure applied to the compression sensor 203. Preferably, the relative configuration of the input and the output varies in proportion with (or in inverse proportion with) the compressive pressure applied to the compression sensor 203.

When a compressive pressure (i.e. a pressure having a component perpendicular to the substrate) is applied to the compression sensor 203, the compressible spacer is compressed. Consequently, the second end of the input optical fibre 285 (which is attached to the compressible spacer 375) is displaced downwards towards the substrate. In contrast, the first end of the output optical fibre 430 is not displaced downwards by the compressive pressure because the first end of the output optical fibre 430 is attached to the second rigid spacer 327 (which does not compress).

Although not shown, the second end of the input optical fibre 285 and/or the first end of the output optical fibre 430 may additionally or alternatively deform in shape under compression.

As shown in FIG. 5, the input 285 and output 430 optical fibres are moved out of coaxial alignment by the application of compressive pressure.

Whilst FIG. 5 shows a change in the configuration of the second end of the input optical fibre 285 in response to the compressive pressure, it will be appreciated that alternative configurations of spacers could be used to instead provide a change in the configuration of the first end of the output optical fibre 430 in response to the compressive pressure. The key factor is that the relative configuration of the input and the output of the compression sensor 203 (i.e. the relative configuration of the second end of the input optical fibre 285 and the first end of the output optical fibre 430) varies in dependence on a compressive pressure applied to the compression sensor 203.

The skilled person would understand that the first rigid spacer 326 is optional and could be removed. However, the first rigid spacer 326 is advantageous as it limits the displacement of the input optical fibre 285 in the region of the input optical fibre 285 located above the first rigid spacer 326. As a consequence, when the compressive pressure is applied to the compression sensor 203, the displacement of the second end of the input optical fibre 285 (attached to the compressible spacer 375) in the direction perpendicular to the substrate 125 is greater than if the first rigid spacer 326 were not present. Thus, the first rigid spacer 326 increases the sensitivity of the compression sensor 203.

The skilled person would understand that second rigid spacer 327 could be replaced with a second compressible spacer having different material properties, and a different compressibility than the compressible spacer 375, so as to create the described change in the relative configuration of the input and the output. However, it is preferable for the second rigid spacer 327 to be rigid to increase the sensitivity of the compression sensor 203. The sensitivity of the compression sensor 203 depends on the material properties of compressible spacer 375.

Figure 6:
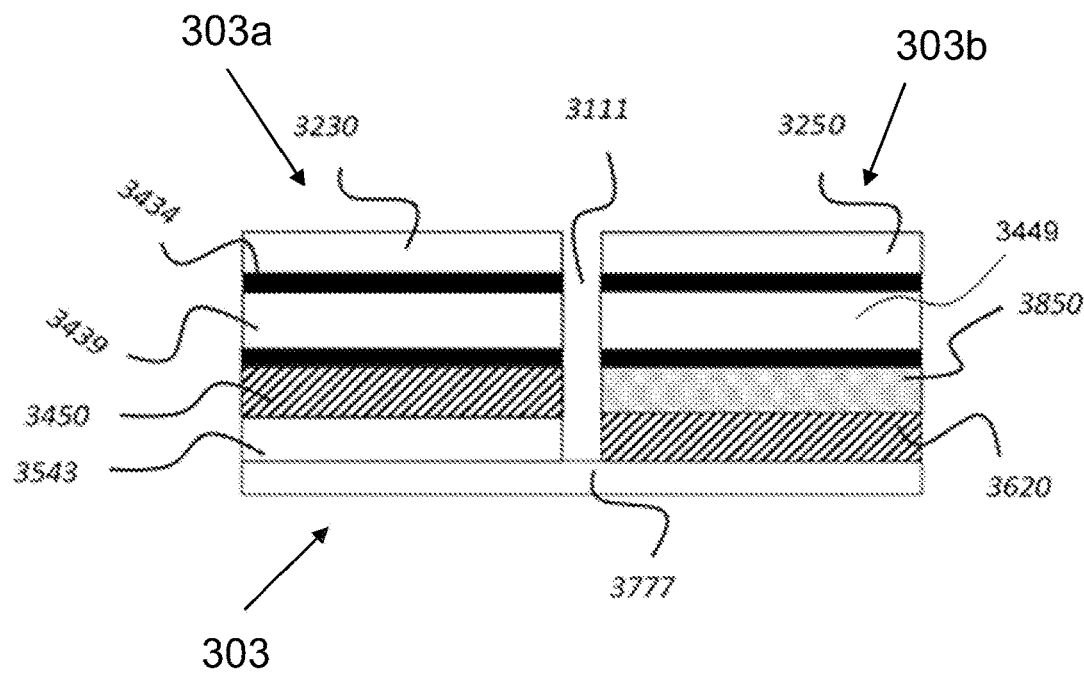
FIG. 6 is a cross section of a third example of an optical compression sensor in an uncompressed configuration (no compressive pressure applied).

Optical Compression Sensor Example 3:

FIG. 6 shows an example of an optical compression sensor 303 on a substrate 3777. The optical compression sensor 303 shown in FIG. 6 could act as at least one of the first compression sensor 35, the second compression sensor 50, and the third compression sensor 95 described in FIG. 1B above. The substrate 3777 forms part of the substrate 7 of FIG. 1B.

In FIG. 6, the compression sensor 303 is formed from an input portion 303a and an output portion 303b. The input portion 303a comprises an input optical fibre 3439, a first rigid layer 3450 and a flexible layer 3543. The first rigid layer 3450 is sandwiched between the input optical fibre 3439 and the flexible layer 3543. The flexible layer 3543 is sandwiched between the first rigid layer 3450 and a first part of the substrate 3777. The input portion 303a of the compression sensor 303 further includes a first part of optional upper lamination film 3230 which, along with the first part of the substrate 3777, encapsulates the input optical fibre 3439, the first rigid layer 3450 and the flexible layer 3543 so as to form a laminated structure. The output portion 303b comprises an output optical fibre 3449, a compressible layer 3850 and a second rigid layer 3620. The compressible layer 3850 is sandwiched between the output optical fibre 3449 and the second rigid layer 3620. The second rigid layer 3620 is sandwiched between the compressible layer 3850 and a second part of the substrate 3777. The output portion 303b of the compression sensor 303 further includes a second part of the upper lamination film 3250 which, along with the second part of the substrate 3777, encapsulates the output optical fibre 3449, the compressible layer 3850 and the second rigid layer 3620 so as to form a similar laminated structure. There is an air gap 3222 between the input optical fibre 3439 and the output optical fibre 3449. The air gap 3222 also extends between the first 3230 and second 3250 parts of the upper lamination film, between the compressible 3850 and first rigid 3450 layers, and between the flexible 3543 and second rigid 3620 layers. However, the substrate 3777 is continuous (with no air gap) and supports both the input and output portions 303a, 303b of the compression sensor 303.

In the compression sensor 303 shown in FIG. 6, the input optical fibre 3439 acts as the previously described input connector. The input optical fibre 3439 has a core and a cladding 3434 that surrounds the core. The output optical fibre 3449 acts as the previously described output connector extending between the output of the compression sensor 303 and the light detector 6a, 6b, 6c. The output optical fibre 3449 has a core and a cladding that surrounds the core. The input optical fibre 3439 has a first end and a second end. The output optical fibre 3449 has a first end and a second end. The first end of the input optical fibre 3439 is connected to the light source 4a, 4b, 4c. The second end of the input optical fibre 3439 is the input of the compression sensor 303. Thus, the input optical fibre 3439 extends between the light source 4a, 4b, 4c and the input of the compression sensor 303. The first end of the output optical fibre 3449 is the output of the compression sensor 303. The second end of the output optical fibre 3449 is connected to the light detector 6a, 6b, 6c. Thus, the output optical fibre 3449 extends between the output of the compression sensor 303 and the light detector 6a, 6b, 6c.

FIG. 6 schematically illustrates the compression sensor 303 with no compressive pressure applied. In this uncompressed configuration, the second end of the input optical fibre 3439 and the first end of the output optical fibre 3449 are substantially coaxial. The signal path between the input and the output of the compression sensor 303 is a signal path from the second end of the input optical fibre 3439 through the air gap 3111 and to the first end of the output optical fibre 3449.

As described above, the compression sensor 303 comprises a compressible layer 3850 sandwiched between the output optical fibre 3449 and the second rigid layer 3620 (the second rigid layer 3620 being attached to, and positioned above, the substrate 3777). Thus, the compression sensor 303 comprises a compressible member (in the form of the compressible layer 3850) between the substrate 3777 (indirectly, via the second rigid layer 3620) and the output of the compression sensor 303 (i.e. the first end of the output optical fibre 3449). In an alternative configuration (not shown), the compressible layer 3850 could be included in the input portion 303a rather than the output portion 303b. In this alternative configuration, the compression sensor 303 comprises a compressible member (in the form of the compressible layer) between the substrate 3777 the input (i.e. the second end of the input optical fibre 3449).

The compression sensor 303 may be formed by attaching a single optical fibre to the first rigid 3450 and compressible 3850 layers. Next, the first rigid 3450 and compressible 3850 layers are arranged on (or attached to) the flexible 3543 and second rigid 3620 layers such that a) the first rigid layer 3450 is sandwiched between the input optical fibre 3439 and the flexible layer 3543 and b) the compressible layer 3850 is sandwiched between the output optical fibre 3449 and the second rigid layer 3620. The flexible 3543 and second rigid 3620 layers are then attached to (or arranged on) the substrate 3777. The optical fibres 3439, 3449, and the compressible 3850, flexible, 3543 and rigid 3450,3620 layers are encapsulated between the upper lamination film 3230, 3250 and the substrate 3777. Heat or ultrasound may be then applied to create the laminated structure, the substrate 3777 acting as a lower lamination film. The laminated structure may then be cut locally to form the air gap 3111 between the input 303a and output 303b portions of the compression sensor 303. No cut is made through the substrate 3777, so the input 303a and output 303b portions are linked by a common substrate 3777 (the first and second parts of the substrate 3777 being the regions of the common substrate 3777 located beneath the input optical fibre 3439 and the output optical fibre 3449 respectively). The cut may be achieved using a sharp implement, such as a knife.

In use, the light source 4a, 4b, 4c emits an initial light signal. The initial light signal emitted by the light source 4a, 4b, 4c enters the input optical fibre 3439 at the first end. The input optical fibre 3439 guides the initial light signal from the first end of the input optical fibre 3439 to the second end of the input optical fibre 3439. The initial light signal is emitted from the second end of the input optical fibre 3439 to the air gap 3111. There is a signal path between the second end of the input optical fibre 3439 and the first end of the output optical fibre 3449. The signal path passes through the air gap 3111. Typically, when the input optical fibre 3439 and the output optical fibre 3449 are arranged to be substantially coaxial, there is a small loss (in the region of 20%) of the initial signal in transmission along the signal path due to the air gap 3111. The first end of the output optical fibre 3449 receives a sensor signal. The sensor signal is a light signal that comprises at least some of the initial light signal. The output optical fibre 3449 guides the sensor signal received by the first end of the output optical fibre 3449 to the second end of the output optical fibre 3449. The second end of the output optical fibre 3449 is connected to the light detector 6a, 6b, 6c. The light detector 6a, 6b, 6c detects the sensor signal.

Figure 7:
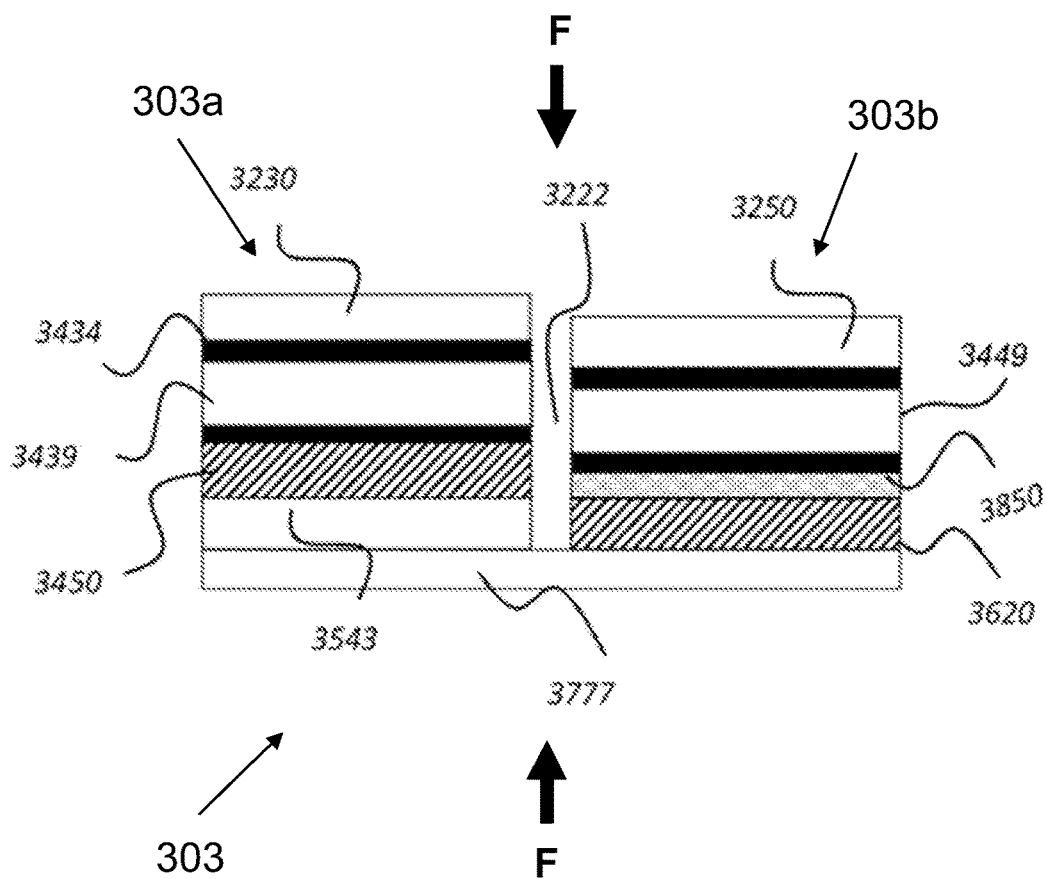
FIG. 7 shows the optical compression sensor of FIG. 6 upon application of compressive pressure.

FIG. 7 shows the optical compression sensor 303 of FIG. 6, in use, and upon the application of compressive pressure.

In use, the compressive pressure may be applied by disposing the compression sensor 303 and substrate 3777 between a compression bandage (or a compression garment) and a human leg, as described above with reference to FIG. 1A. The compressive pressure on the compression sensor 303 is depicted by the arrows labelled F in FIG. 7. As in the previous examples of FIGS. 5 and 3, the compressive pressure is in a direction perpendicular to the substrate 3777 (or at least includes a component in a direction perpendicular to the substrate 3777). The input and the output of the compression sensor 303 (i.e. the second end of the input optical fibre 3449 and the first end of the output optical fibre 3439) are arranged such that their relative configuration varies in dependence on a compressive pressure applied to the compression sensor 303. Preferably, the relative configuration of the input and the output varies in proportion with (or in inverse proportion with) the compressive pressure applied to the compression sensor 303.

When a compressive pressure (i.e. a pressure having a component perpendicular to the substrate) is applied to the compression sensor 303, the compressible layer 3850 is compressed. Consequently, the first end of the output optical fibre 3449 (which is attached to the compressible layer 3850) is displaced downwards towards the substrate. In contrast, the second end of the input optical fibre 3439 is not displaced downwards by the compressive pressure because the first end of the output optical fibre 3439 is attached to the first rigid layer 3450 (which does not compress).

Although not shown, the second end of the input optical fibre 3439 and/or the first end of the output optical fibre 3449 may additionally or alternatively deform in shape under compression.

As shown in FIG. 7, the input 3439 and output 3449 optical fibres are moved out of coaxial alignment by the application of compressive pressure.

Whilst FIG. 7 shows a change in the configuration of the first end of the output optical fibre 3449 in response to the compressive pressure, it will be appreciated that alternative configurations of the compressible 3850, rigid 3450, 3620 and flexible 3543 layers could be used to instead provide a change in the configuration of the second end of the input optical fibre 3439 in response to the compressive pressure. The key factor is that the relative configuration of the input and the output of the compression sensor 303 (i.e. the relative configuration of the second end of the input optical fibre 3439 and the first end of the output optical fibre 3449) varies in dependence on a compressive pressure applied to the compression sensor 303.

The sensitivity of the compression sensor 303 depends on the material properties of compressible layer 3850.

The skilled person would understand that the first rigid layer 3450 could be replaced with a second compressible layer having different material properties, and a different compressibility, than the compressible layer 3850 or removed entirely. However, the first rigid layer 3450 is advantageous as it limits the displacement of the input optical fibre 3439. As a consequence, when the compressive pressure is applied to the compression sensor 303, the displacement of the first end of the output optical fibre 3449 relative to the second end of the input optical fibre 3439 is greater than if the first rigid layer 3450 were not present or not rigid. Thus, the first rigid layer 3450 increases the sensitivity of the compression sensor 303.

The skilled person would understand that second rigid layer 3620 is optional but assists in achieving compression of the compressible layer 3850 by forming a rigid surface against which the compressible layer 3850 may be compressed, thus increasing the sensitivity of the compression sensor 303.

Further, the skilled person would understand that flexible layer 3543 is optional. The flexible layer is advantageous because it acts as a compensation layer to level the compression sensor 303 so that in the uncompressed configuration the input optical fibre 3439 and the output optical fibre 3449 are substantially coaxial. In an alternative example (not shown) the combined first rigid layer 3450 and flexible layer 3543 could be replaced by a thicker first rigid layer 3450.

Figure 8:
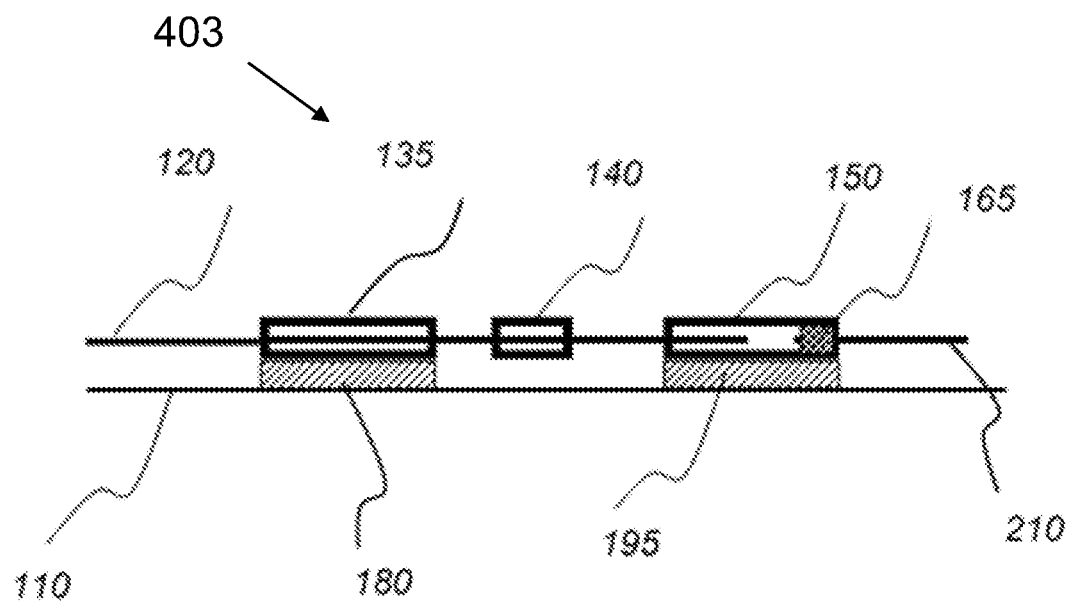
FIG. 8 is a side view of a fourth example of an optical compression sensor in an uncompressed configuration (no compressive pressure applied).

Optical Compression Sensor Example 4:

FIG. 8 shows an example of an optical compression sensor 403. The optical compression sensor 403 shown in FIG. 8 could act as at least one of the first compression sensor 35, the second compression sensor 50, and the third compression sensor 95 described in FIG. 1B above.

In FIG. 8, the compression sensor 403 comprises an input optical fibre 120 and an output optical fibre 210. The compression sensor 403 further comprises guiding members in the form of a first micro tube 135, a second micro tube 140 and a third micro tube 150. The input optical fibre 120 has a first end and a second end. The output optical fibre 210 has a first end and a second end. The input optical fibre 120 passes through the first micro tube 135 and the second micro tube 140 and into the third micro tube 150 such that the second end of the input optical fibre 120 is enclosed within the third micro tube 150. The first end of the output optical fibre 210 is also enclosed within the third micro tube 150 such that the second end of the input optical fibre 120 and the first end of the output optical fibre 210 and the signal path therebetween are located within the third micro tube 150. There is an air gap between the second end of the input optical fibre 120 and the first end of the output optical fibre 210. The signal path passes through the air gap. The compression sensor 403 further comprises a first spacer 180 and a second spacer 195. The first spacer 180 connects the first micro tube 135 to the substrate 110. The second spacer 195 connects the third micro tube 150 to the substrate 110. The second micro tube 140 is suspended above the substrate 110 and is not connected to the substrate 110.

In the compression sensor 403 shown in FIG. 8, the input optical fibre 120 acts as the previously described input connector. The input optical fibre 120 has a core and a cladding that surrounds the core (not shown). The output optical fibre 210 acts as the previously described output connector extending between the output of the compression sensor 403 and the light detector 6a, 6b, 6c. The output optical fibre 210 has a core and a cladding that surrounds the core (not shown). The first end of the input optical fibre 120 is connected to the light source 4a, 4b, 4c. The second end of the input optical fibre 120 is the input of the compression sensor 403. Thus, the input optical fibre 120 extends between the light source 4a, 4b, 4c and the input of the compression sensor 403. The first end of the output optical fibre 210 is the output of the compression sensor 403. The second end of the output optical fibre 210 is connected to the light detector 6a, 6b, 6c. Thus, the output optical fibre 210 extends between the output of the compression sensor 403 and the light detector 6a, 6b, 6c.

FIG. 8 schematically illustrates the compression sensor 403 with no compressive pressure applied. In this uncompressed configuration, the second end of the input optical fibre 120 and the first end of the output optical fibre 210 are substantially coaxial and are separated by an initial distance in the form of the air gap. The signal path between the input and the output of the compression sensor 403 is a signal path from the second end of the input optical fibre 120 through the air gap and to the first end of the output optical fibre 210.

The micro tubes 135, 140, 150 have an inner diameter that is preferably very slightly larger than the outer diameter of the input 120 and output 210 optical fibres so as to restrict the movement of the input 120 and output 210 optical fibres to be coaxial within the micro tubes 135, 140, 150.

The micro tubes 135, 140, 150 may be made from metal, plastic, ceramic or any other suitable material. Preferably, the second micro tube 140 has a length of up to 2 cm and the first 135 and third 150 micro tubes have a length of up to 5 cm.

The first 180 and second 195 spacers are preferably less than 1 mm thick to ensure the compression sensor is compact, and thus comfortable for the wearer.

The first end of the output optical fibre 210 is preferably fixed in place near one end of the third micro tube 150 such that it cannot move relative to the third micro tube 150. The second end of the input optical fibre 120 is not fixed so it is free move coaxially within the third micro tube 150.

In use, the light source 4a, 4b, 4c emits an initial light signal. The initial light signal emitted by the light source 4a, 4b, 4c enters the input optical fibre 120 at the first end. The input optical fibre 120 guides the initial light signal from the first end of the input optical fibre 120 to the second end of the input optical fibre 120. The initial light signal is emitted from the second end of the input optical fibre 120 to the air gap. There is a signal path between the second end of the input optical fibre 120 and the first end of the output optical fibre 210. The signal path passes through the air gap. Typically, when the compression sensor 403 is in the uncompressed configuration of FIG. 8, there is a small loss (in the region of 20%) of the initial signal in transmission along the signal path due to the air gap having its initial distance. The first end of the output optical fibre 210 receives a sensor signal. The sensor signal is a light signal that comprises at least some of the initial light signal. The output optical fibre 210 guides the sensor signal received by the first end of the output optical fibre 210 to the second end of the output optical fibre 210. The second end of the output optical fibre 210 is connected to the light detector 6a, 6b, 6c. The light detector 6a, 6b, 6c detects the sensor signal.

Figure 9:
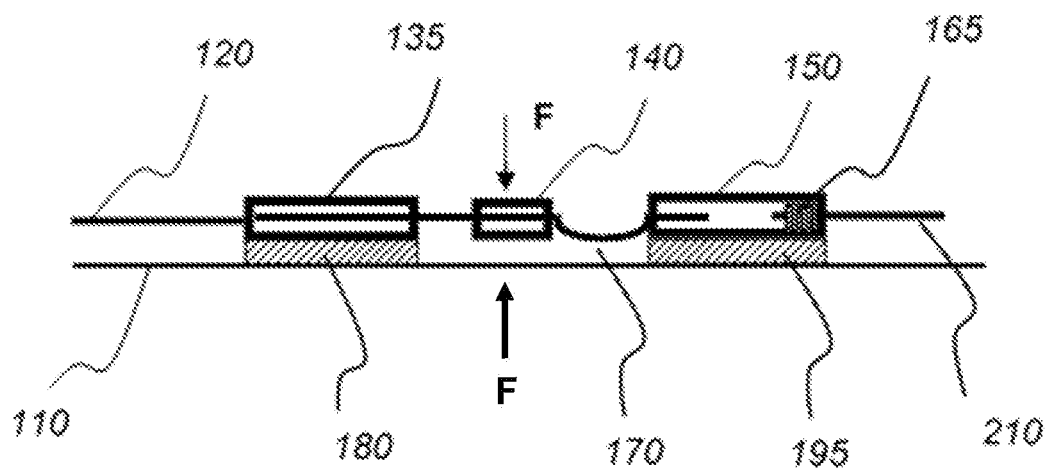
FIG. 9 shows the optical compression sensor of FIG. 8 upon application of compressive pressure.

FIG. 9 shows the optical compression sensor 403 of FIG. 8, in use, and upon the application of compressive pressure.

In use, the compressive pressure may be applied by disposing the compression sensor 403 and substrate 110 between a compression bandage (or a compression garment) and a human leg, as described above with reference to FIG. 1A. The compressive pressure on the compression sensor 403 is depicted by the arrows labelled F in FIG. 9. As in the previous examples of FIGS. 7, 5 and 3, the compressive pressure is in a direction perpendicular to the substrate 110 (or at least includes a component in a direction perpendicular to the substrate 110). The input and the output of the compression sensor 403 (i.e. the second end of the input optical fibre 120 and the first end of the output optical fibre 210) are arranged such that their relative configuration varies in dependence on a compressive pressure applied to the compression sensor 403. Preferably, the relative configuration of the input and the output varies the compressive pressure applied to the compression sensor 403.

When a compressive pressure (i.e. a pressure having a component perpendicular to the substrate) is applied to the compression sensor 403, the second micro tube 140 is displaced downwards towards the substrate 110. Consequently, a section of the input optical fibre 120 that is threaded through the second micro tube 140 undergoes a displacement (along with the second micro tube 140) towards the substrate 110. The input optical fibre 120 is not elastic, and so when the section of the input optical fibre 120 that is threaded through the second micro tube 140 is displaced downwards, it pulls the input optical fibre 120 partially out of the third micro tube 150. In particular, the second end of the input optical fibre 120 undergoes an axial displacement along the third micro tube 150 away from the fixed first end of the output optical fibre 210. The axial displacement (which is in a direction parallel to the substrate 110) varies the relative configuration of the second end of the input optical fibre 120 and the first end of the output optical fibre 210 (i.e. it varies the relative configuration of the input and output of the compression sensor 403). In other words, the change in configuration described above includes a displacement of the compression sensor input and output in the direction parallel to the substrate 110.

For example, if the second end of the input optical fibre 120 is displaced axially away from the first end of the output optical fibre 210, then the air gap, and the signal path, between the second end of the input optical fibre 120 and the first end of the output optical fibre 210 increases from the first distance of FIG. 8 to a second distance as shown in FIG. 9. As a result, the amount of the initial light signal emitted from the second end of the input optical fibre 120 that enters the first end of the output optical fibre 210 will be lower than in the uncompressed configuration of FIG. 8 in which the second end of the input optical fibre 120 and the first end of the output optical fibre 210 are located closer together.

Preferably, the sensor signal varies in inverse proportion with the compressive pressure.

As described above, the first end of the output optical fibre 210 is fixed in position so it is not displaced by the compressive pressure. However, the skilled person would understand that instead of fixing the first end of the output optical fibre 210, the second end of the input optical fibre 120 could be fixed in position. In this alternative example, the first end of the output optical fibre 210 would be free to move axially. The key factor is that the relative configuration of the input and the output of the compression sensor 403 (i.e. the relative configuration of the second end of the input optical fibre 120 and the first end of the output optical fibre 210) varies in dependence on a compressive pressure applied to the compression sensor 403.

The skilled person would understand that the spacers 180, 195 are optional, but are advantageous as they increase the possible range of displacements of the second micro tube 140, and hence increase the sensitivity of the compression sensor 403. The skilled person would similarly understand that the first 135 and second 140 micro tubes are optional.

Figure 10:
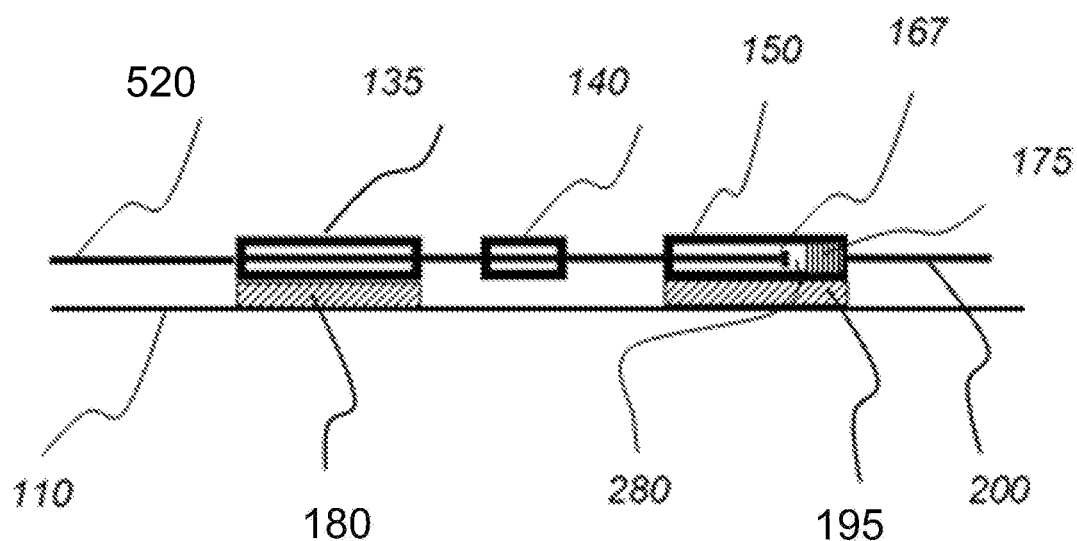
FIG. 10 is a side view of an example of a capacitive compression sensor in an uncompressed configuration (no compressive pressure applied).

Capacitive Compression Sensor Example:

FIG. 10 shows an example of a capacitive compression sensor on a substrate 110. The capacitive compression sensor shown in FIG. 10 could act as at least one of the first compression sensor 35, the second compression sensor 50, and the third compression sensor 95 described in FIG. 1B above. The substrate 110 forms part of the substrate 7 of FIG. 1B.

The capacitive compression sensor shown in FIG. 10 is an example of an electrical compression sensor. For electrical compression sensors, such as the capacitive compression sensor shown in FIG. 10, the signal emitter is an electrical signal emitter/generator such as a coil, and the signal detector is an electrical signal detector such as a coil or a MEMS sensor. The signal emitter may be one of the signal emitters 4a, 4b, 4c, and will be referred to as "electrical signal generator 4a, 4b, 4c" hereafter. The signal detector may be one of the signal detectors 6a, 6b, 6c, and will be referred to as "electrical signal detector 6a, 6b, 6c" hereafter. For the capacitive compression sensor shown in FIG. 10, the electrical signal generator is an AC electrical signal generator and the electrical signal detector is an AC electrical signal detector.

The structural arrangement of the compression sensor shown in FIG. 10 is analogous to the structural arrangement of the optical compression sensor shown in FIG. 8 in terms of the substrate 110 and the micro tubes 135, 140, 150. Similarly, spacers 580, 595 in FIG. 10 are equivalent to spacers 180, 195 in FIG. 8. However, FIG. 10 differs from FIG. 8 in that an input conducting wire 520 replaces the input optical fibre 120 of FIG. 8, and an output conducting wire 200 replaces the output optical fibre 210 of FIG. 8. The compression sensor of FIG. 10 further comprises a variable capacitor formed between a first plate 167 at the second end of the input conducting wire 520 and a second plate 175 at the first end of the output conducting wire 200. The signal path passes between the capacitor plates 167, 175. The capacitance is variable by varying the distances between the capacitor plates 167, 175.

In the compression sensor shown in FIG. 10, the input conducting wire 520 acts as the previously described input connector, extending between the electrical signal generator 4a, 4b, 4c and the input of the compression sensor. More specifically, the first end of the input conducting wire 520 is connected to the electrical signal generator 4a, 4b, 4c and the second end of the input conducting wire is connected to the first capacitor plate 167. The input of the compression sensor is the first capacitor plate 167. The output conducting wire 200 acts as the previously described output connector, extending between the output of the compression sensor and the electrical signal detector 6a, 6b, 6c. More specifically, the first end of the output conducting wire 200 is connected to the second capacitor plate 175 and the second end of the output conducting wire is connected to the electrical signal detector 6a, 6b, 6c. The output of the compression sensor is the second capacitor plate 175.

FIG. 10 schematically illustrates the compression sensor with no compressive pressure applied. In this uncompressed configuration, the signal path between the input and the output of the compression sensor is a signal path from the first capacitor plate 167 through an air gap 280, to the second capacitor plate 175. Thus, the air gap 280 is representative of a distance between the plates 167, 175 of the variable capacitor.

The second capacitor plate 175 is preferably fixed in place so that it is unable to move relative to the third micro tube 150. The first capacitor plate 167 is not fixed and is free to move axially within the third micro tube 150 in a direction parallel to the substrate 110.

In an alternative example, rather than being a simple two plate 167, 175 device with an air gap 280, the variable capacitor may be a more advanced MEMs type capacitor. That is, the capacitor plates may be thin-film MEMS-type micro-fabricated capacitor plates. The capacitor plates may comprise a plurality of interleaved protrusions (such as interdigitated fingers). In this case, the capacitance would vary in dependence upon a degree of interleaving of the protrusions (e.g. interdigitation of the fingers). In this interleaved example, the capacitor plates may be located in a common plane. In particular, the capacitor plates may have interdigitated fingers arranged to be located in a common plane. This arrangement of the interdigitated fingers may help to keep the compression sensor thin and unobtrusive to the wearer of the sensing device.

In use, the electrical signal generator 4a, 4b, 4c applies a voltage across the plates 167, 175 of the variable capacitor, and the electrical signal detector 6a, 6b, 6c detects the capacitance between the plates 167, 175. The voltage may be considered an emitted electrical signal, and the capacitance may be considered as a detected electrical signal. The capacitance of the variable capacitor varies in dependence on a distance between the plates 167, 175. There is a first distance between the plates 167, 175 in the uncompressed configuration of FIG. 10.

Figure 11:
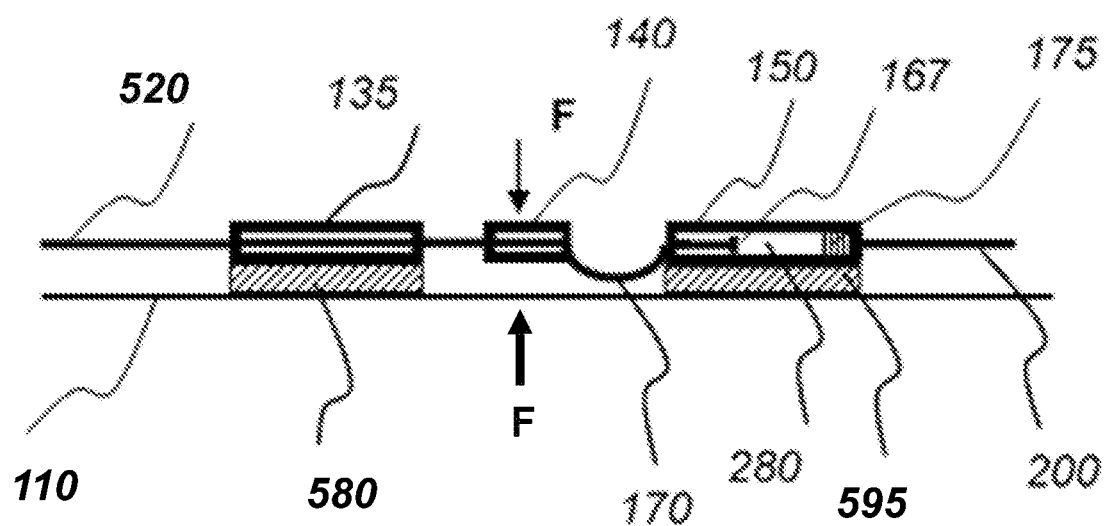
FIG. 11 shows the capacitive compression sensor of FIG. 10 upon application of compressive pressure.

FIG. 11 shows the capacitive compression sensor of FIG. 10, in use, and upon the application of compressive pressure.

In use, the compressive pressure may be applied by disposing the compression sensor and substrate 110 between a compression bandage (or a compression garment) and a human leg, as described above with reference to FIG. 1A. The compressive pressure on the compression sensor is depicted by the arrows labelled F in FIG. 11. As in the previous examples of FIGS. 9, 7, 5 and 3, the compressive pressure is in a direction perpendicular to the substrate 110 (or at least includes a component in a direction perpendicular to the substrate 110). The input and the output of the compression sensor (i.e. the plates 167, 175 of the variable capacitor) are arranged such that their relative configuration varies in dependence on a compressive pressure applied to the compression sensor. Preferably, the distance 280 between the plates 167, 175 varies in proportion with the compressive pressure applied to the compression sensor.

As for the optical example of FIG. 9, when a compressive pressure is applied to the compression sensor in FIG. 11, the second micro tube 140 displaces downwards towards the substrate 110. Consequently, the input conducting wire 520 is partially pulled out of the third micro tube 150 such that the first capacitor plate 167 moves further away from the second capacitor plate 167 (i.e. the first capacitor plate 167 is displaced axially (with respect to the third micro tube 150) in a direction parallel to the substrate 110. In other words, the distance 280 between the plates 167, 175 increases. The displacement of the first capacitor plate 167 varies the relative configuration of the input and the output of the variable capacitor. In other words, the change in configuration described above includes a displacement in the direction parallel to the substrate 110. The change in configuration of the input and the output of the variable capacitor results in a change of capacitance. The sensor signal received by the electrical signal detector 6a, 6b, 6c varies in dependence on the capacitance of the variable capacitor.

As described above, the first end of the output connecting wire 200 is fixed in position so it is not displaced by the compressive pressure. However, the skilled person would understand that instead of fixing the first end of the output connecting wire 200, the second end of the input connecting wire 520 could be fixed in position. In this alternative example, the first end of the output connecting wire 200 would be free to move axially. The key factor is that the relative configuration of the input and the output of the compression sensor (i.e. the relative configuration of the capacitor plates 167, 175) varies in dependence on a compressive pressure applied to the compression sensor.

Figure 12:
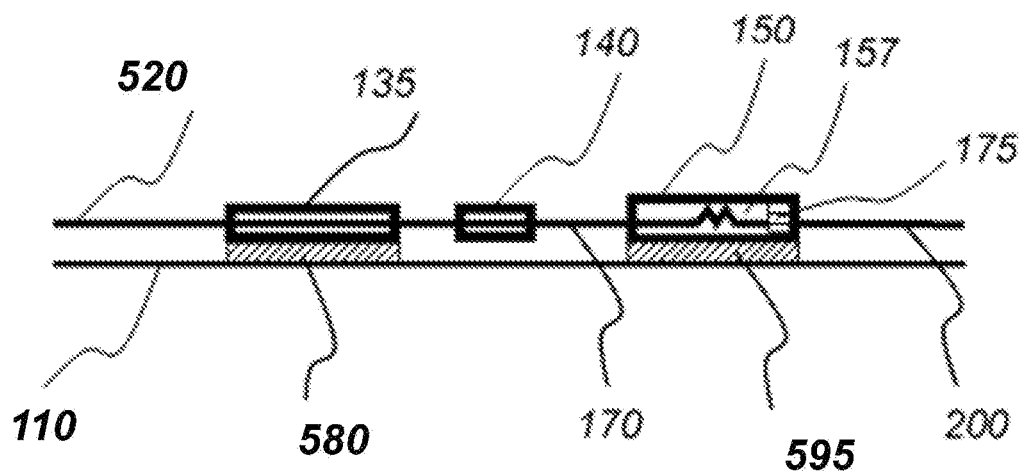
FIG. 12 is a side view of an example of a resistive compression sensor in an uncompressed configuration (no compressive pressure applied).

The skilled person would understand that the spacers 580, 595 are optional, but are advantageous as they increase the possible range of displacements of the second micro tube 140, and hence increase the sensitivity of the compression sensor 403. The skilled person would similarly understand that the first 135 and second 140 micro tubes are optional.
Resistive Compression Sensor Example:

FIG. 12 shows an example of a resistive compression sensor. The resistive compression sensor shown in FIG. 12 could act as at least one of the first compression sensor 35, the second compression sensor 50, and the third compression sensor 95 described in FIG. 1B above.

The resistive compression sensor is analogous to the capacitive compression sensor described above with respect to FIGS. 10 and 11 except the variable capacitor is replaced by a variable resistor 157 connected between the second end of the input conducting wire 520 and the first end of the output conducting wire 200. The resistance of the variable resistor 157 varies in dependence on a distance between an input and an output of the variable resistor (i.e. a distance between the second end of the input conducting wire 520 and the first end of the output conducting wire 200).

The variable resistor 157 is a displacement sensing resistor such as strain gauge, conductive polymer, or piezoresistive element.

Figure 13:
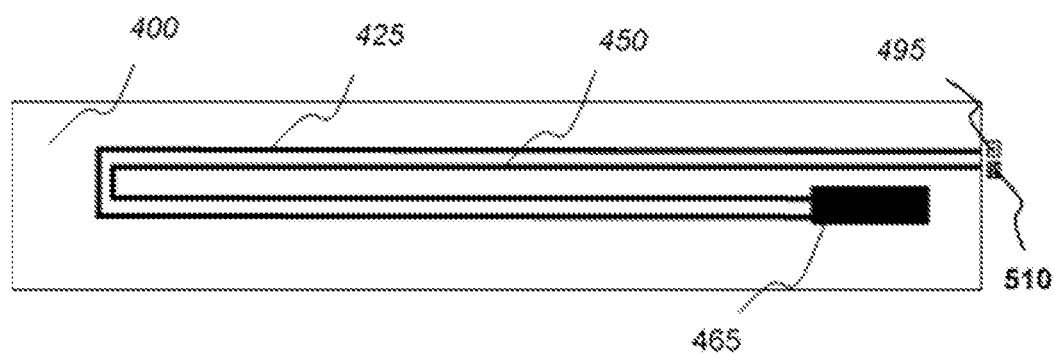
FIG. 13 is another example of the substrate of the sensing device of FIG. 1A, viewed from above, with a single optical compression sensor arranged on the substrate.

The skilled person would understand that the variable resistor example of FIG. 12 could be readily adapted to incorporate a magnetic field sensor. In such an example, the electrical signal generator 4a, 4b, 4c could be replaced with a magnetic field emitter, the signal detector 6a, 6b, 6c could be replaced with a magnetic field detector (e.g. a Hall-effect or Lorentz-effect sensor, which may be a MEMS sensor), and the variable resistor could be replaced with a magnet.
Optical Compression Sensor Example 5:

FIG. 13 shows an optical compression sensor 465 similar to that described with respect to FIGS. 8 and 9. As with the example shown in FIGS. 8 and 9, the example of FIG. 13 includes a substrate 400, an input optical fibre 425 and an output optical fibre 450. The input optical fibre 425 extends between the light source 495 and the input of the compression sensor 465. The output optical fibre 450 extends between the output of the compression sensor 465 and the light detector 510. The example shown in FIG. 13 differs from the example shown in FIGS. 8 and 9 because the input optical fibre 425 and the output optical fibre 450 are not coaxial. Instead, the input optical fibre 425 and the output optical fibre 450 are parallel and adjacent to one another. The second end of the input optical fibre 425 is adjacent to the first end of the output optical fibre 450.

Figure 14:
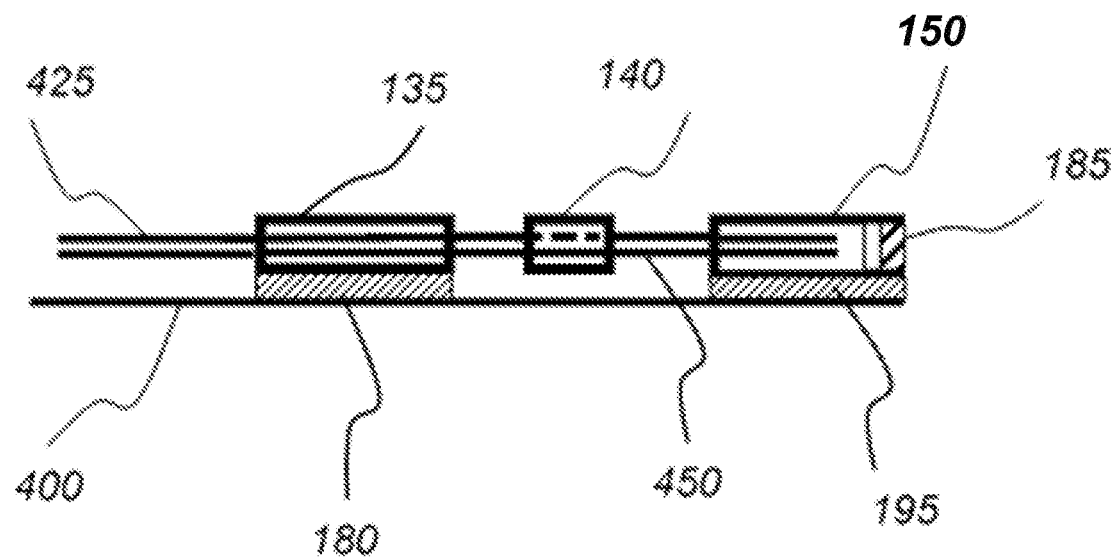
FIG. 14 is a side view of the optical compression sensor of FIG. 13 in an uncompressed configuration (no compressive pressure applied).

FIG. 14 shows a cross section of the optical compression sensor 465 of FIG. 13 in a plane perpendicular to the substrate. The structural arrangement of the compression sensor 465 is analogous to the structural arrangement of the optical compression sensor shown in FIG. 8 in terms of the substrate 400 and the micro tubes 135, 140, 150. Similarly, spacers 180, 195 in FIG. 14 are equivalent to spacers 180, 195 in FIG. 8. Furthermore, as in FIG. 8, the input of the compression sensor 465 is the second end of the input optical fibre 425, and the output of the compression sensor 465 is the first end of the output optical fibre 450.

In FIG. 14, the input optical fibre 425 extends through the first micro tube 135 and into the third micro tube 150. The input optical fibre 425 does not extend through the second micro tube 140. Instead, the input optical fibre 425 extends parallel to and adjacent the second micro tube 140 (as indicated by the dashed line). In contrast, the output optical fibre 450 extends through all three micro tubes 135, 140, 150. Neither the second end of the input optical fibre 425 nor the first end out the output optical fibre 450 are fixed in position within the third micro tube 150. Instead, both the second end of the input optical fibre 425 and the first end out the output optical fibre 450 are free to move axially within the third micro tube 150 (i.e. in a direction parallel to the substrate 400).

The compression sensor of FIG. 14 further comprises a signal reflector 185 (i.e. a light reflector) disposed in the signal path between the second end of the input optical fibre 425 (i.e. the input of the compression sensor 465) and the first end of the output optical fibre 450 (i.e. the output of the compression sensor 465). Thus, the signal path comprises (a) an air gap between the second end of the input optical fibre 425 and the signal reflector, (b) the signal reflector 185 itself, and (c) an air gap between the signal reflector and the first end of the output optical fibre 450. The signal reflector 185 is a mirror such as a micro mirror. Both the second end of the input optical fibre 425 and the first end out the output optical fibre 450 are separated from the mirror 185 by a small initial distance in the uncompressed configuration of FIG. 14.

In use, the light source emits 495 an initial light signal. The initial light signal emitted by the light source 495 enters the input optical fibre 425 at the first end. The input optical fibre 425 guides the initial light signal from the first end of the input optical fibre 425 to the second end of the input optical fibre 425. The initial light signal is emitted from the second end of the input optical fibre 425 to the air gap. There is a signal path between the second end of the input optical fibre 425 and the first end of the output optical fibre 450. The signal path passes through the air gap and involves a reflection from the mirror 185. The first end of the output optical fibre 450 receives a sensor signal. The sensor signal is a light signal that comprises at least some of the initial light signal. The output optical fibre 450 guides the sensor signal received by the first end of the output optical fibre 450 to the second end of the output optical fibre 450. The second end of the output optical fibre 450 is connected to the light detector. The light detector detects the sensor signal.

Figure 15:
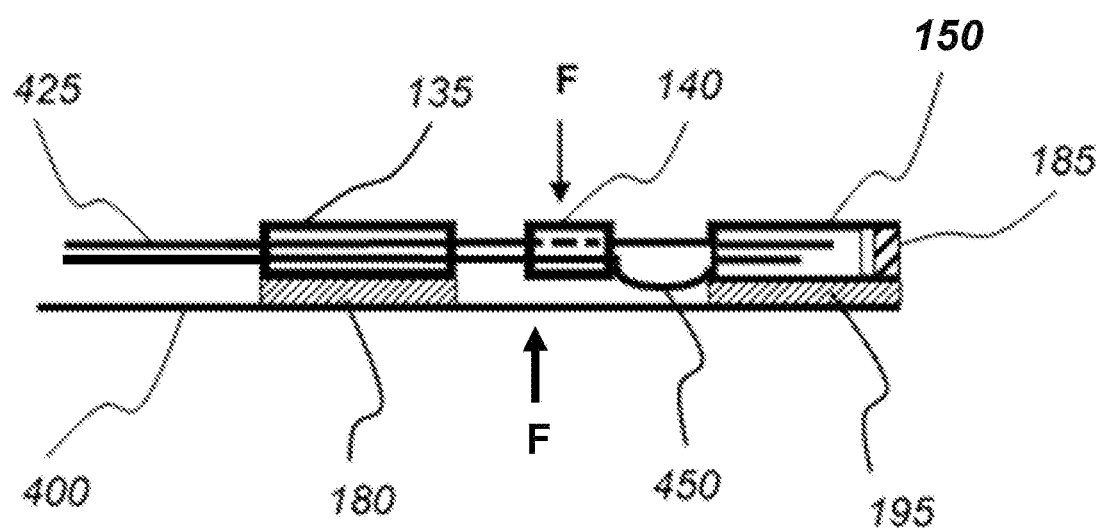
FIG. 15 shows the optical compression sensor of FIGS. 13 and 14 upon application of compressive pressure.

FIG. 15 shows the optical compression sensor 465 of FIG. 14, in use, and upon the application of compressive pressure. In use, the compressive pressure may be applied by disposing the compression sensor 465 and substrate 400 between a compression bandage (or a compression garment) and a human leg, as described above with reference to FIG. 1A. The compressive pressure on the compression sensor 465 is depicted by the arrows labelled F in FIG. 14.

As in the previous examples of FIGS. 11, 9, 7, 5 and 3, the compressive pressure is in a direction perpendicular to the substrate 400 (or at least includes a component in a direction perpendicular to the substrate 400). The input and the output of the compression sensor 465 (i.e. the second end of the input optical fibre 425 and the first end of the output optical fibre 450) are arranged such that their relative configuration varies in dependence on a compressive pressure applied to the compression sensor 465.

When a compressive pressure is applied to the compression sensor 465, the second micro tube 140 is displaced downwards towards the substrate 400. Consequently, a section of the output optical fibre 450 that extends through the second micro tube 140 undergoes a displacement (along with the second micro tube 140) towards the substrate 400. The output optical fibre 450 is not elastic, and so when the section of the output optical fibre 450 that extends through the second micro tube 140 is displaced downwards, it pulls the output optical fibre 450 partially out of the third micro tube 150. In particular, the first end of the output optical fibre 450 undergoes an axial displacement along the third micro tube 150 away from the fixed mirror 185. The axial displacement (which is in a direction parallel to the substrate 400) varies the relative configuration of the second end of the input optical fibre 425 and the first end of the output optical fibre 450 and the signal path therebetween. In particular, the length of the signal path between the second end of the input optical fibre 425 and the first end of the output optical fibre 450 increases because the distance between the first end of the output optical fibre 450 and the mirror 185 has increased). In other words, the change in configuration described above includes a displacement of the output of the compression sensor 465 in a direction parallel to the substrate 400. The axial displacement (which is in a direction parallel to the substrate 400) also changes the relative configuration of the first end of the output optical fibre 450 and the mirror 185. Thus, the second end of the input optical fibre 425 and the first end of the output optical fibre 450 are configured such that, in response to the compressive pressure, at least one of the second end of the input optical fibre 425 and the first end of the output optical fibre 450 undergoes a displacement relative to the signal reflector 185 so as to vary the signal path. Due to the change in signal path length, the amount of the initial light signal emitted from the second end of the input optical fibre 425 that enters the first end of the output optical fibre 450 will be lower under compression (as in FIG. 15) than in the uncompressed configuration of FIG. 14.

Notably, the input optical fibre 425 (which does not extend through the second micro tube 140) may also be somewhat affected by compressive pressure. In particular, the input optical fibre 425 may also be displaced downwards towards the substrate 400 such that the second end of the input optical fibre 425 is pulled further away from the mirror 185, thereby increasing the signal path still further. However, the downward displacement of the output optical fibre 450 is enhanced by the presence of the micro tube 140, so the downward displacement of the input optical fibre 425 will be less than the downward displacement of the output optical fibre 450. In an alternative arrangement, both optical fibres 425, 450 could extend through the second micro tube 140 to provide greater sensitivity of the compression sensor 465. The skilled person would also understand that the input optical fibre 425 could extend through the second micro tube 140 instead of the output optical fibre 450 extending through the second micro tube 140. In a further option, the end of the optical fibre which does not extend through the second micro tube 140 could be fixed in place in the third micro tube 150 relative to the mirror 185.

Figure 16:
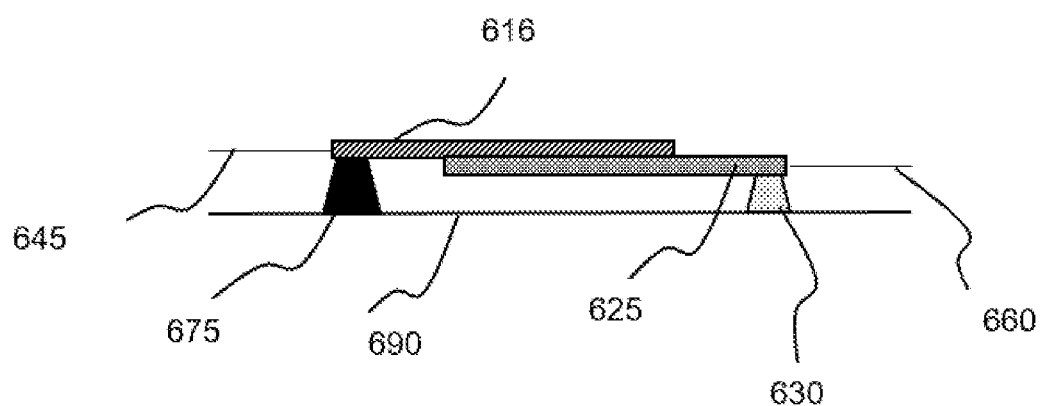
FIG. 16 is a side view of a further example of an optical compression sensor in an uncompressed configuration (no compressive pressure applied).

Optical Compression Sensor Example 6:

FIG. 16 shows an example of an optical compression sensor. The optical compression sensor 103 shown in FIG. 16 is not suitable to act as at least one of the first compression sensor 35, the second compression sensor 50, and the third compression sensor 95 described in FIG. 1B above without modification because there is no input connector connecting the light source to the input of the compression sensor, and there is no output connector connecting the output of the compression sensor to the light detector. Instead, in the compression sensor shown in FIG. 16, the input of the compression sensor is a light source 616, and the output of the compression sensor is a light detector 625. Thus, the light source 616 and the light detector 625 are coupled to the substrate 690 in FIG. 16, rather than being disposed off the substrate, as shown in FIG. 1B.

The light source 616 is not attached directly to the substrate 690 and the light detector 625 is not attached directly to the substrate 690. Instead, one end of the light source 616 is separated from the substrate 690 by a first rigid spacer 675 and one end of the light detector 625 is separated from the substrate 690 by a compressible spacer 630. The other ends of the light source 616 and the light detector 630 are arranged to overlap.

The compression sensor comprises a compressible member (i.e. in the form of compressible spacer 630) between the substrate 690 and the light emitter 616. In an alternative configuration, the compressible spacer 630 and the rigid spacer 690 could be swapped such that he compression sensor comprises a compressible member between the substrate 690 and the light detector 625.

The sensing device further comprises an input contact 645 and an output contact 660. The contacts 645, 660 connect the optical compression sensor to an electronic control and power unit. Preferably, the contacts 645, 660 are conducting wires.

In use, the light source 616 emits an initial light signal. A portion of the initial light signal emitted by the light source 616 is directly detected by the light detector 625 as a sensor signal. Thus, there is a signal path between the light source 616 and the light detector 625.

The light source 616 and the light detector 625 are arranged such that the sensor signal received by the light detector 625 varies in dependence on a relative configuration of light source 616 and the light detector 625. In particular, the sensor signal varies in dependence on a degree of overlap between the light source 616 and the light detector 630. The light source 616 and the light detector 625 are arranged such that their relative configuration (i.e. their overlap) varies in dependence on the compressive pressure applied to the compression sensor.

When no compressive pressure is applied to the compression sensor (i.e. as shown in FIG. 16), the light source 616 and the light detector 625 and the signal path therebetween are arranged in an initial, uncompressed configuration.

Figure 17:
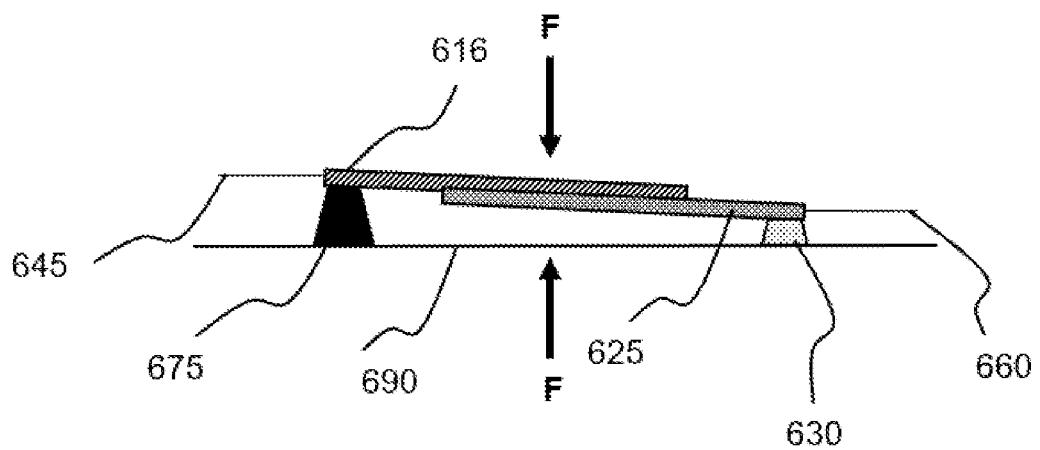
FIG. 17 shows the optical compression sensor of FIG. 16 upon application of compressive pressure.

FIG. 17 shows the compression sensor when a compressive pressure (i.e. a pressure having a component perpendicular to the substrate) is applied. The compressive pressure compresses the compressible spacer 630 in a direction perpendicular to the substrate. Consequently, the signal detector 625 is displaced relative to the signal emitter 675.

The light source 616 and the light detector 625 may additionally or alternatively deform in shape in response to the compressive pressure.

The described displacement or deformation changes the relative configuration of the light source 616 and the light detector 625. In particular, degree of overlap of the light source 616 and the light detector 625 changes. The greater the overlap, the larger the sensor signal received by the light detector 625. The lesser the overlap, the smaller the sensor signal received by the light detector 625.

The sensitivity of the compression sensor depends on the material properties of compressible spacer 630.

The skilled person would understand that the rigid spacer 675 could be replaced with a second compressible spacer having different material properties, and a different compressibility, than the compressible spacer 630. However, it is preferable for the rigid spacer 675 to be rigid to increase the sensitivity of the compression sensor.

The skilled person would understand that the arrangement shown in FIG. 1B could be adapted such that the compression sensor shown in FIGS. 16 and 17 is suitable to act as at least one of the first compression sensor 35, the second compression sensor 50, and the third compression sensor 95 of FIG. 1B. For example, the input connector could be replaced with the first contact 645 and the output connector could be replaced with the second contact 660. Further, the signal emitter and the signal detector of FIG. 1B could be moved to form a part of the compression sensor as described by FIG. 16.

Figure 18:
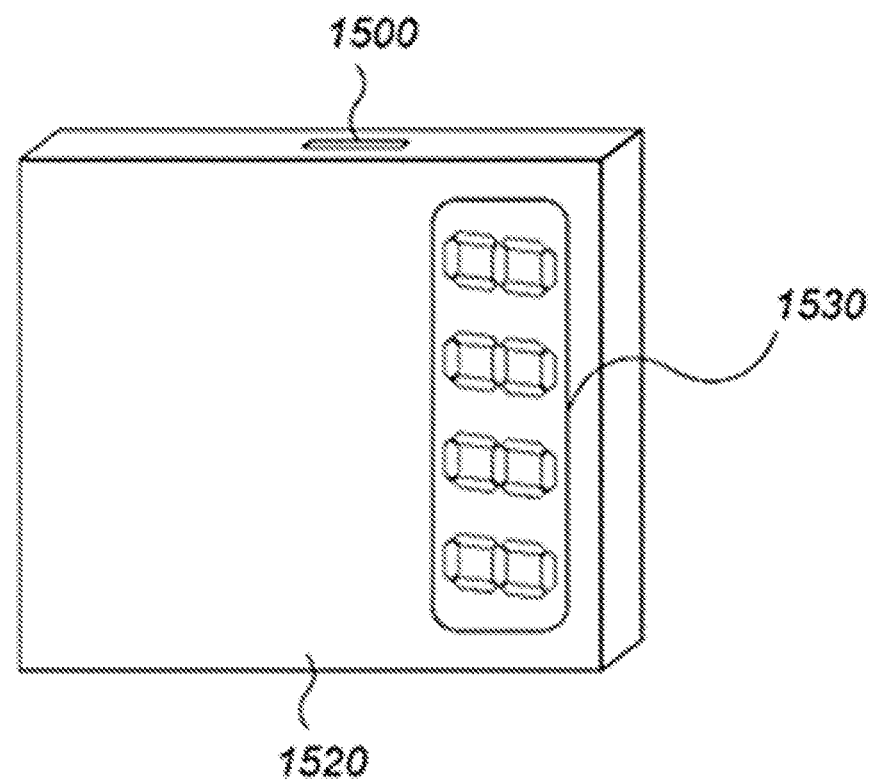
FIG. 18 is an electronic power and control unit, suitable for use in a sensing device comprising the compression sensor of any one of FIG. 2-12, or 14-17.

Electronic Power and Control Unit:

FIG. 18 schematically illustrates an electronic control and power supply unit 1520 that may be used with any example of the sensing device described above. The control and power supply unit 1520 may comprise signal amplifiers, an analogue-to-digital converter, a microcontroller or other processor, memory, a data logger, a wireless transmission system (e.g. Bluetooth™), discrete or integrated electronic components, FPGAs, DSPs, ASICs, etc. The microcontroller or other processor may be configured to determine an estimate of the pressure applied to the sensing device based on the sensor signal. The electronic control and power supply may have a digital display 1530 which is configured to display instantaneous readings of the estimate of the pressure applied to the sensing device. The electronic control and power supply unit 1520 may also comprise an audio indicator 1500, e.g. for signalling an alert if the estimate of the pressure applied to the sensing device is outside a target range e.g. if the compression bandage (or garment) is applied to the wearer too tightly or too loosely. The entire electronic control and power supply may be contained within a housing of the unit 1520.

Measurements determined by the sensing device can be captured at intervals and stored in the data logger prior to processing in the microprocessor. Measurements may be taken and recorded in the data logger as frequently as desired—e.g. every minute or every hour. Data from the data logger or the microprocessor may be transmitted by the transmission system to a remote device or server. This may be a smartphone, laptop, pager or other device. The remote device can keep a record of the estimate of the pressure applied to the sensing device that can be used for clinical evaluation. This data logging may be used by clinicians for clinical monitoring of a patient wearing the sensing device.

The electronic control and power supply unit 1520 may further comprise a rechargeable coin cell for supplying electrical power to the sensing device and the electrical components of the electronic control and power supply unit 1520. The electronic control and power supply unit 1520 supplies a voltage of 5V or less. The electronic control and power supply unit 1520 further comprises a USB port 1500 by which data may be retrieved from the data logger.

The electronic control and power supply unit 1520 may be attached to a compression bandage (or garment) via adhesive pads, a hook-and-loop connecting mechanism or similar, or it may be integrated into a housing or casing of the sensing device. Alternatively, the electronic control and power supply unit 1520 may be communicatively coupled to the sensing device. For example, the electronic control and power supply unit 1520 may be connected by a cable, or other suitable wired or wireless power and communication link, and be located remotely from the sensing device—e.g. in a pocket of clothing worn by the wearer, or on a bedside trolley. The electronic power and control unit 1520 may be configured to estimate pressures in the range 2 mmHg to 100 mmHg

The invention claimed is:

1. A sensing device for sensing a compressive pressure applied by a compression bandage or a compression garment, the sensing device comprising:
    a flexible substrate for wearing beneath the compression bandage or the compression garment; and
    a compression sensor attached to the flexible substrate, the compression sensor comprising an input and an output and a signal path therebetween,
    wherein the input and the output are arranged such that a sensor signal received by the output varies in dependence on an alignment of the input and the output; and
    wherein the alignment of the input and the output varies in dependence on a compressive pressure applied to the compression sensor, the compressive pressure having a component perpendicular to the substrate, and
    wherein the input and the output are configured such that, in response to the compressive pressure, at least one of the input and the output undergoes a displacement, relative to the substrate, in a direction perpendicular to the substrate; and wherein said displacement in the direction perpendicular to the substrate varies the alignment of the input and the output.

2. The sensing device of claim 1, wherein the input and the output are configured such that, in response to the compressive pressure, at least one of the input and the output undergoes a structural deformation; and wherein the structural deformation varies the alignment of the input and the output.

3. The sensing device of claim 1, wherein the compression sensor further comprises a compressible member between the substrate and one of the input and the output; wherein the compressible member is configured to compress in response to the compressive pressure applied to the compression sensor; and wherein the alignment of the input and the output and/or the signal path therebetween varies in dependence on the compression of the compressible member.

4. The sensing device of claim 1, further comprising a processor, the processor configured to determine an estimate of the pressure applied to the sensing device based on the sensor signal.

5. The sensing device of claim 4, further comprising at least one of: a digital display configured to display the estimate of the pressure applied to the sensing device; or an audio indicator configured to output an audible alert if the estimate of the pressure applied to the sensing device is outside of a predetermined range.

6. The sensing device of claim 1, further comprising a signal emitter and a signal detector.

7. The sensing device of claim 6, wherein the signal emitter is a light source and the signal detector is a light detector, and wherein the sensing device further comprises:

an input optical fibre extending between the light source and the input of the compression sensor; and an output optical fibre extending between the output of the compression sensor and the light detector.

8. The sensing device of claim 6, wherein the signal emitter is an electrical signal generator and the signal detector is an electrical signal detector, and wherein the sensing device further comprises:

a first conducting wire extending between the electrical signal generator and the input of the compression sensor; and a second conducting wire extending between the output of the compression sensor and the electrical signal detector.

9. The sensing device of claim 8, wherein the compression sensor further comprises a variable resistor electrically connected between the input and the output, or, wherein the compression sensor further comprises a variable capacitor electrically connected between the input and the output.

10. The sensing device of claim 1, wherein the input is a signal emitter and the output is a signal detector; wherein the signal emitter and the signal detector overlap; wherein the sensor signal varies in dependence on a degree of the overlap; and wherein the degree of the overlap varies in dependence on the compressive pressure.

11. The sensing device of claim 1, wherein the compression sensor is one of a plurality of compression sensors attached to the flexible substrate and spaced apart from one another, each compression sensor comprising a respective input and a respective output.

12. The sensing device of claim 11, wherein, for each compression sensor, the respective output is arranged to transmit a respective sensor signal to a respective signal detector.

13. The sensing device of claim 11, wherein, for each compression sensor, the respective input is arranged to receive a respective signal emitted by a respective signal emitter.

* * * * *